United States Patent
Whalin

(10) Patent No.: US 11,170,776 B1
(45) Date of Patent: Nov. 9, 2021

(54) SPEECH-PROCESSING SYSTEM

(71) Applicant: Amazon Technologies, Inc., Seattle, WA (US)

(72) Inventor: Timothy Whalin, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 144 days.

(21) Appl. No.: 16/571,787

(22) Filed: Sep. 16, 2019

(51) Int. Cl.
  *G10L 15/22* (2006.01)
  *G10L 15/08* (2006.01)
  *G10L 15/30* (2013.01)

(52) U.S. Cl.
  CPC ............ *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
  USPC ................................................... 704/1–504
  See application file for complete search history.

(56) References Cited

U.S. PATENT DOCUMENTS

| | | | |
|---|---|---|---|
| 9,424,840 B1 * | 8/2016 | Hart | G10L 15/22 |
| 10,304,444 B2 * | 5/2019 | Mathias | G06F 40/35 |
| 10,365,887 B1 * | 7/2019 | Mulherkar | G06F 3/167 |
| 10,540,976 B2 * | 1/2020 | Van Os | G10L 15/26 |
| 10,600,419 B1 * | 3/2020 | Sarikaya | G10L 15/34 |
| 10,957,313 B1 * | 3/2021 | Sarikaya | G10L 15/1815 |
| 2016/0035353 A1 * | 2/2016 | Chen | G10L 15/1815 704/235 |
| 2017/0278514 A1 * | 9/2017 | Mathias | G10L 15/22 |
| 2018/0144737 A1 * | 5/2018 | Agiomyrgiannakis | G10L 13/033 |
| 2018/0204569 A1 * | 7/2018 | Nadkar | G10L 15/22 |
| 2018/0278514 A1 * | 9/2018 | Chadha | H04L 45/26 |
| 2018/0338191 A1 * | 11/2018 | van Scheltinga | G06F 3/167 |
| 2020/0184967 A1 * | 6/2020 | Gupta | G06F 3/167 |
| 2021/0090555 A1 * | 3/2021 | Mahmood | G10L 15/1815 |

* cited by examiner

*Primary Examiner* — Marcus T Riley
(74) *Attorney, Agent, or Firm* — Pierce Atwood LLP

(57) ABSTRACT

A system may receive audio data that represents a wakeword associated with a first speech-processing system and a command associated with a second speech-processing system. Different indications of handing the audio data off to the second speech-processing system may be determined based on a determined amount of interaction with the second speech-processing system. If the amount of interaction is low, a longer, more detailed indication is generated; if the amount of interaction is high, a brief, less detailed indication is generated. A local device may output audio corresponding to the indication before outputting audio generated by the second speech-processing system in response to the command.

20 Claims, 20 Drawing Sheets

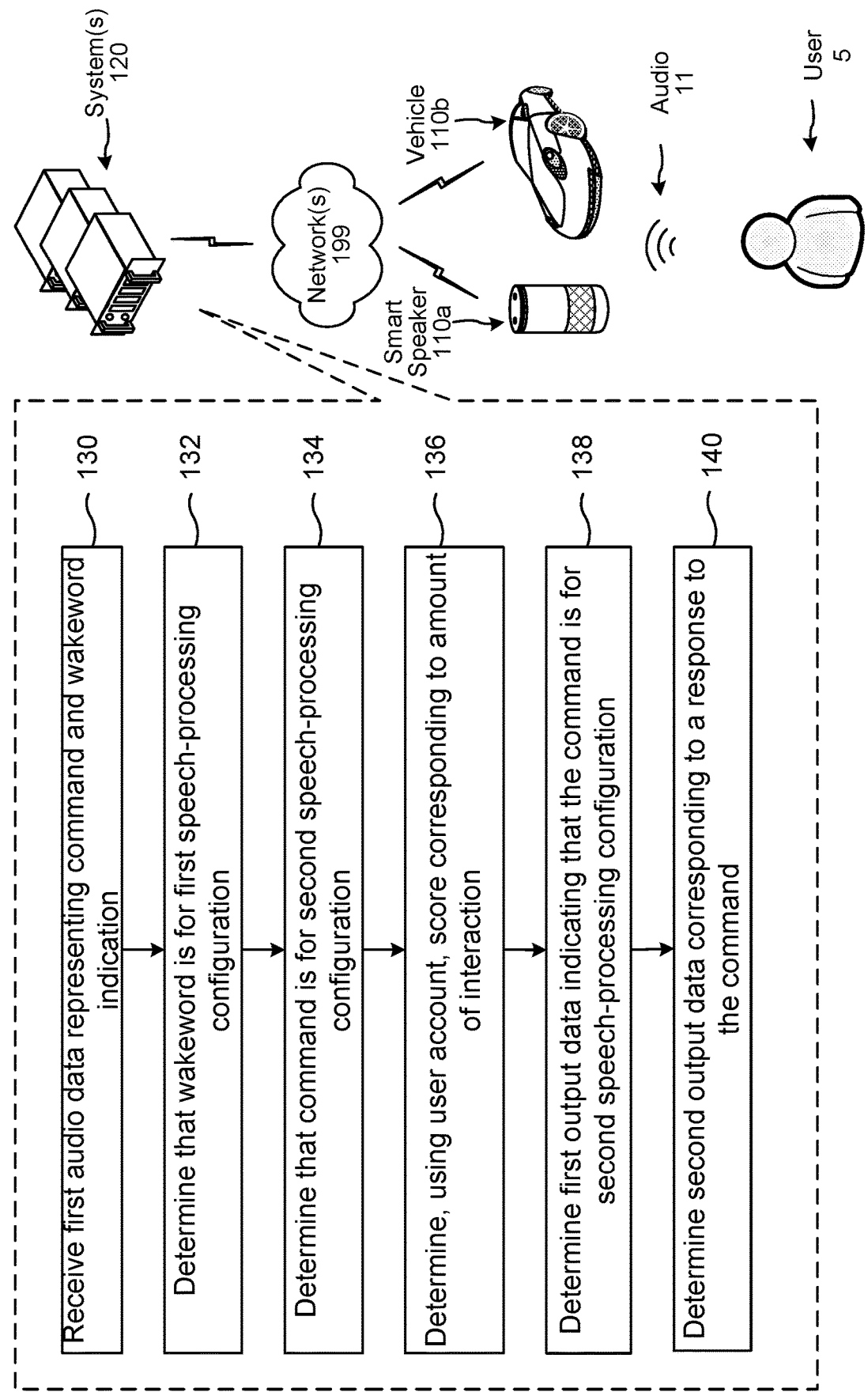

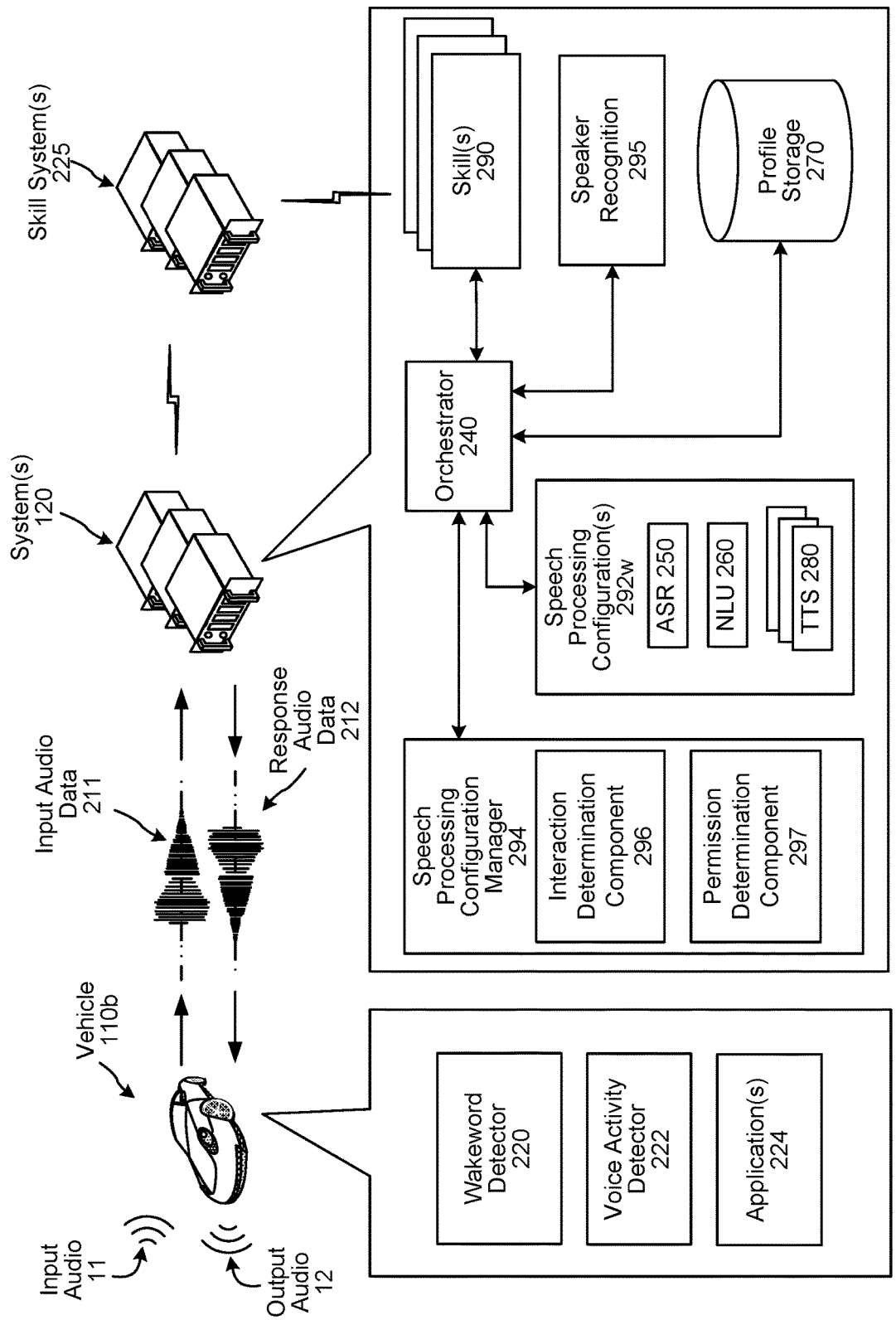

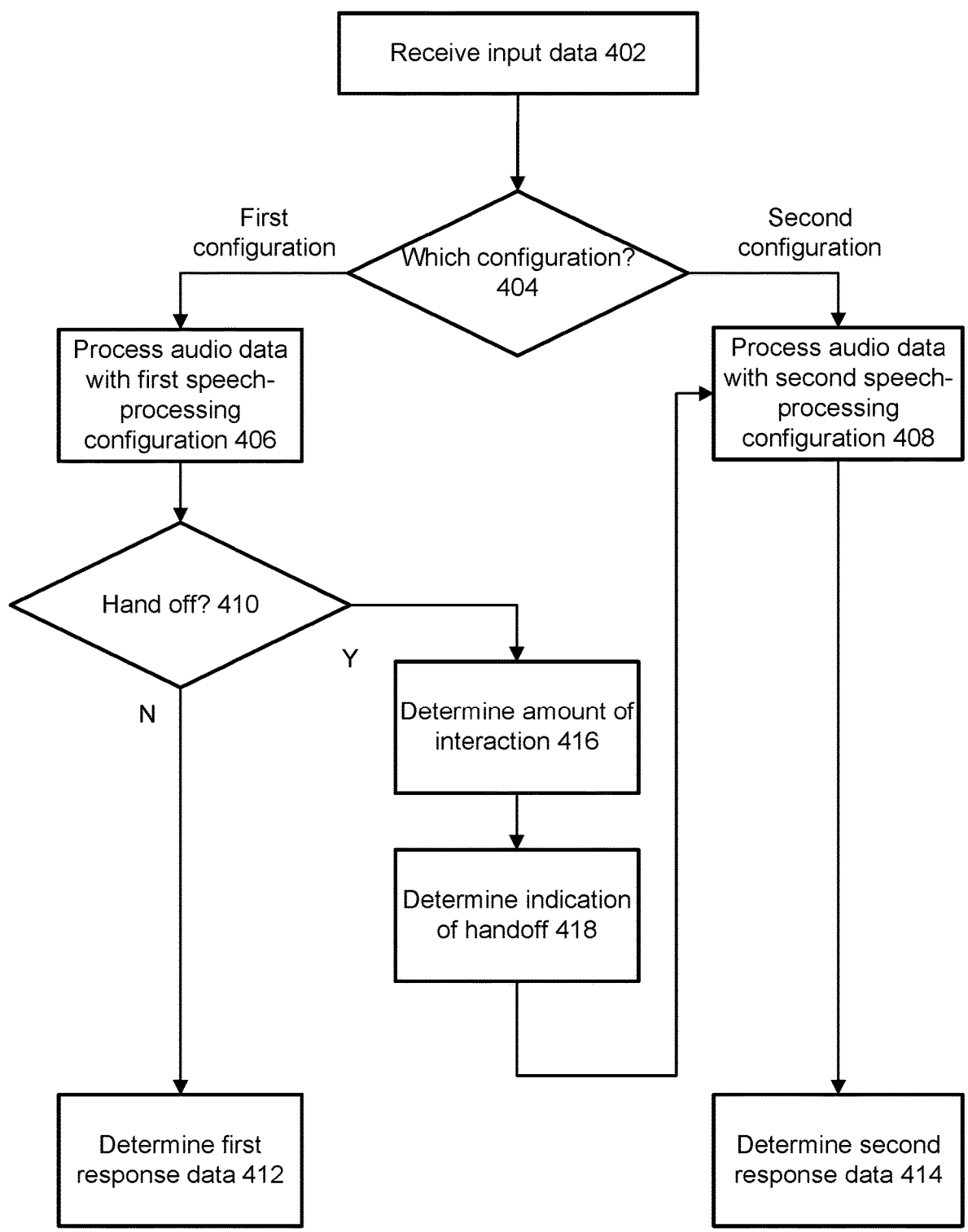

FIG. 4E

| Interaction Score | Response Data |
|---|---|
| 1 | "SmartCar can do that for you. I will hand you off shortly. Would you first like to hear additional SmartCar capabilities?" |
| 2 | "SmartCar can do that for you. I am handing you off." |
| 3 | "SmartCar can do that for you." |
| 4 | "OK, here's SmartCar." |
| 5 | "OK." |

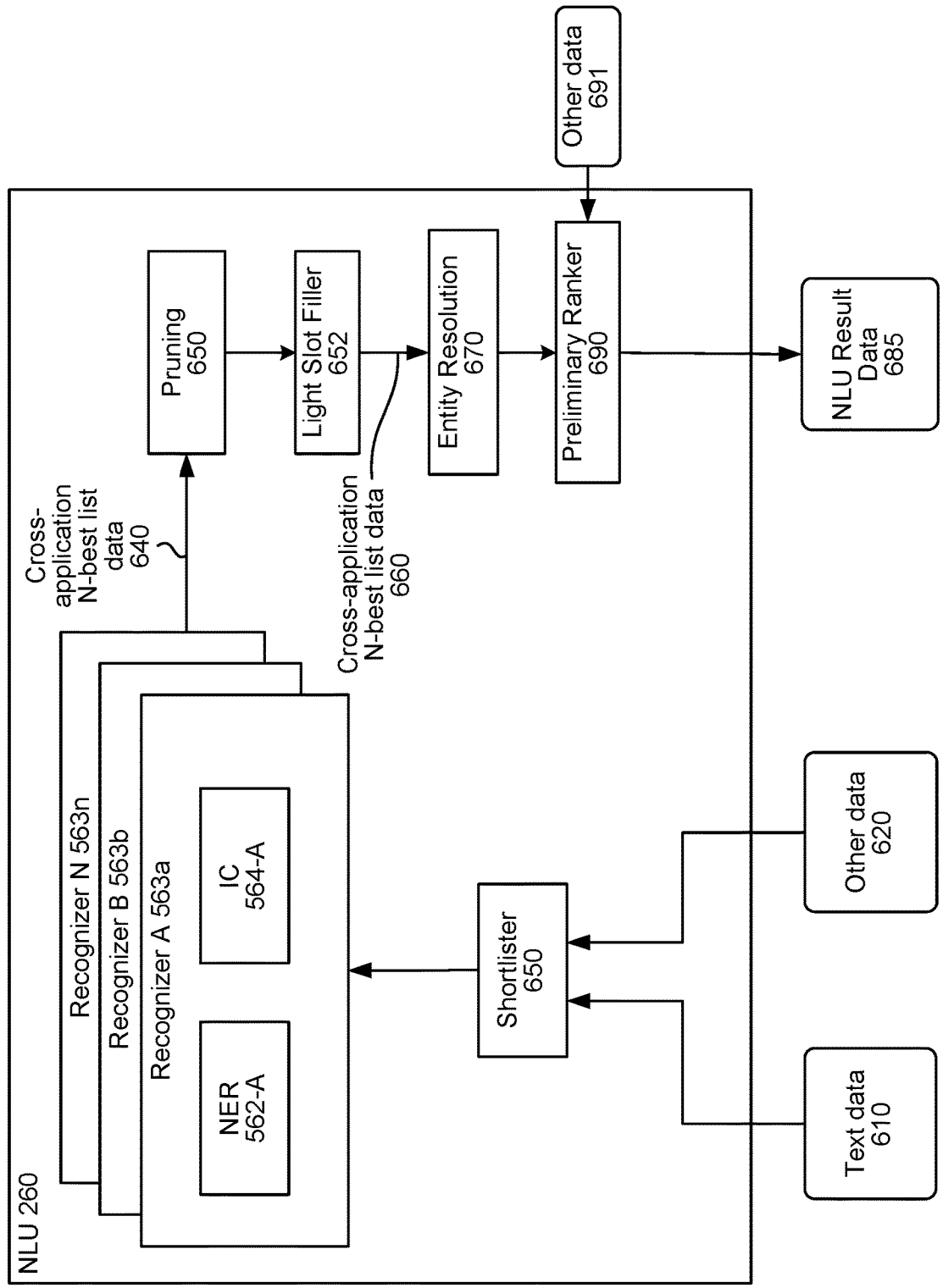

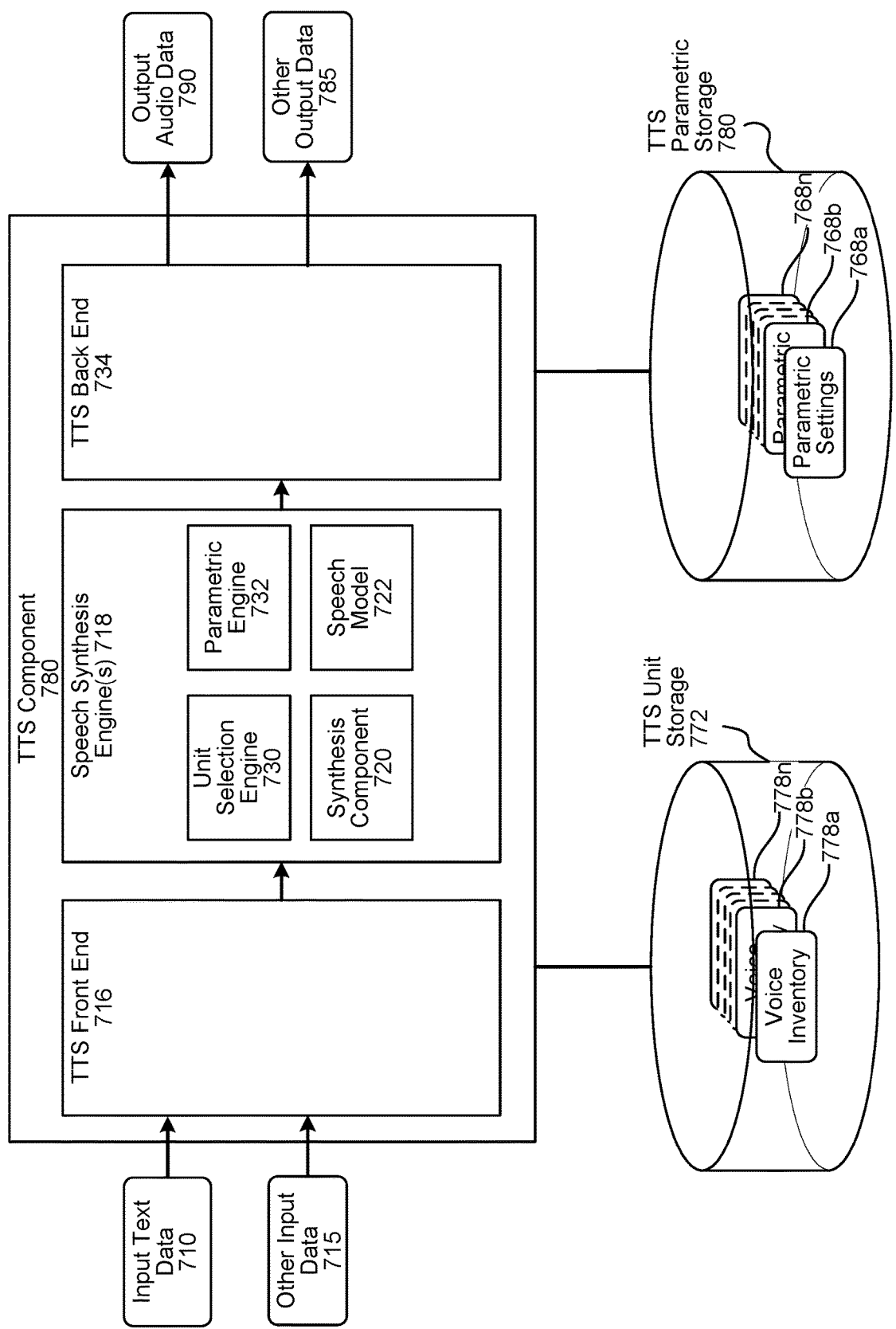

SPEECH-PROCESSING SYSTEM

BACKGROUND

Speech-processing systems allow human users to control computing devices using their voices. These systems identify words spoken by the user based on properties of received audio input that represents human speech. Automatic speech-recognition (ASR) processing combined with natural-language understanding (NLU) processing allows a system to determine text corresponding to the speech and to understand an intent expressed in the speech. ASR processing and NLU processing may be combined with text-to-speech (TTS) processing, which may be used to generate synthesized speech responsive to the human speech, in a speech-processing system. Speech processing may be used by computers, hand-held devices, telephone computer systems, kiosks, and other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to process user input and output response(s) using different speech-processing configurations according to embodiments of the present disclosure.

FIGS. 2A-2E are conceptual diagrams of components of configurations of a speech-processing configurations according to embodiments of the present disclosure.

FIGS. 4A, 4B, 4C, 4D, and 4E are diagrams illustrating use of a speech-processing configurations according to embodiments of the present disclosure.

FIG. 6 is a conceptual diagram of natural language processing according to embodiments of the present disclosure.

FIG. 7A is a conceptual diagram of text-to-speech components according to embodiments of the present disclosure.

DETAILED DESCRIPTION

Figure 2A:
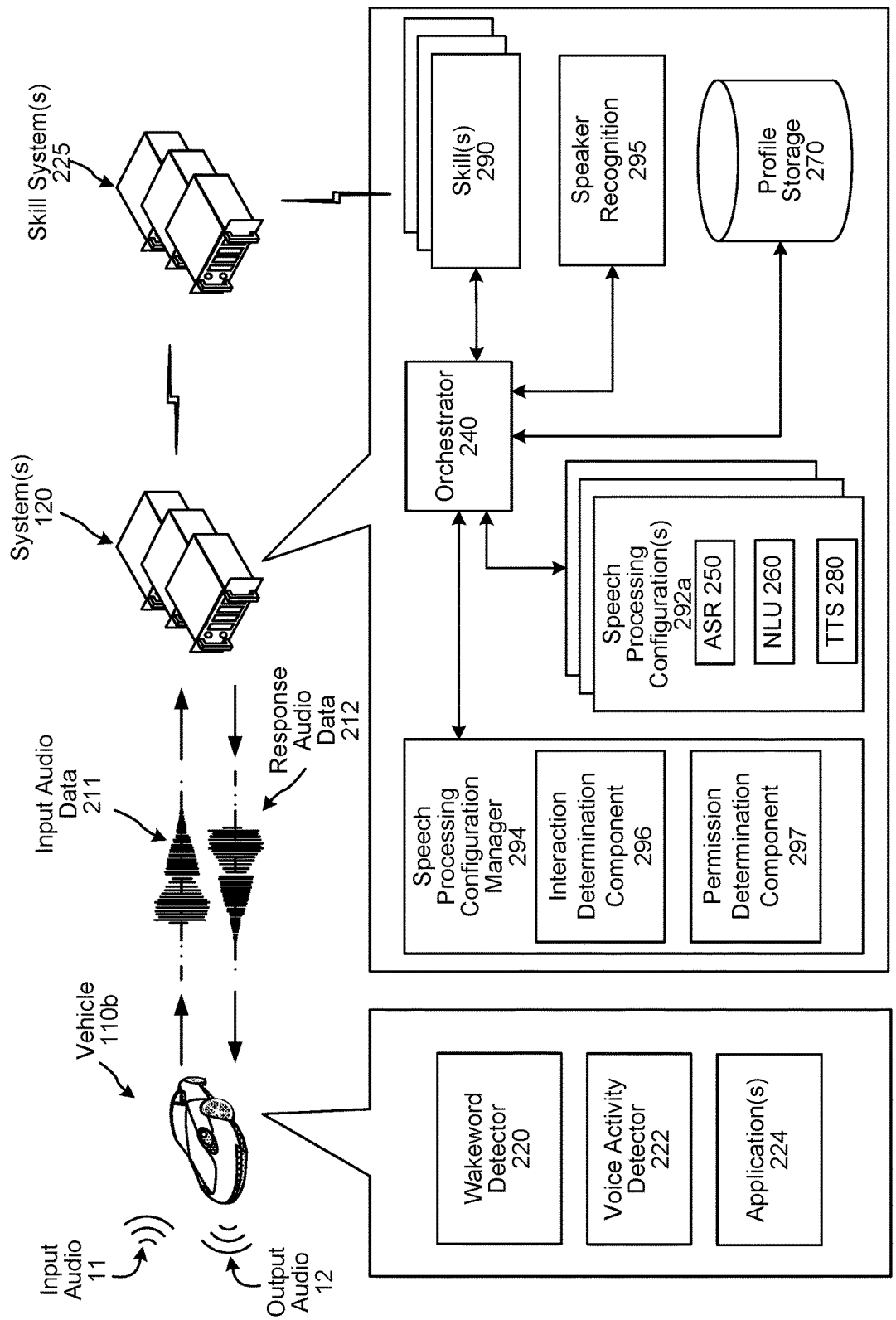

Automatic speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Text-to-speech (TTS) is a field of computer science, artificial intelligence, and linguistics that relates to enabling computers to convert a representation of text into audio data representing synthesized speech. ASR, NLU, and/or TTS may be used together as part of a speech-processing system.

A local user device and/or a remote system may be configured to receive a spoken user input and, using ASR, detect a wakeword and/or other text in the user input; using NLU, determine a command in the user input; and, using TTS, provide a response to the command. In some embodiments, in response to the local user device detecting the wakeword, the local user device may send audio data, representing the user input, to the remote system for further processing (e.g., speech processing). The remote system may further process the audio data to verify that it includes a representation of the wakeword and to determine the command and action. The local user device may then receive, from the remote device, output audio, video, or other data related to the action and/or other data required to perform the action.

The wakeword may be, for example, "Alexa." For example, the local device and/or remote system may be configured may be configured to output weather information in response to user speech including "Alexa, what is the weather." The local device and/or remote system may recognize more than one wakeword; for example, the local device and/or remote system may be further configured to perform an action, such as lowering a window of an automobile, in response to speech from a user including "SmartCar, roll down my window." In this example and throughout the present disclosure, the wakeword "SmartCar" is used to represent a wakeword corresponding to a speech-processing configurations of an automobile; this speech-processing configurations may be capable of performing automobile-specific actions, such as raising/lowering car windows, adjusting car seats, etc. The present disclosure is not, however, limited to only this wakeword (or to only the "Alexa" wakeword) nor to automobiles.

Different wakewords may correspond to different speech-processing configurations. In some embodiments, different speech-processing configurations have different speech-processing components such as different ASR, NLU, and TTS components. In other embodiments, different speech-processing configurations share some speech-processing components, such as ASR and/or NLU components, but have other different components, such as TTS components. In still other embodiments, different speech-processing configurations share more processing components, such as ASR, NLU, and TTS components but configure one or more of those components to behave differently, such as changing TTS configuration data for different speech-processing configurations. Thus, based on a received indication of a speech-processing configuration, such as the wakeword spoken, one or more speech-processing configurations such as ASR, NLU, and/or TTS components, may be selected or configured for performing speech processing. Different ASR, NLU, and/or TTS components or different configurations of those components may have different sets of corresponding capabilities or actions that may be performed in response to receiving the user input. For example, different TTS components or different configurations of those components may be associated with different speech styles for purposes of TTS processing. As another example, different ASR, NLU, and/or TTS components or different configurations of those components may correspond to different feedback mechanisms, such as customized sounds, that are output for each component, or may correspond to customized light emitting diode (LED) colors used for each component, etc. The availability of different speech-processing configurations—which may be activated using different wakewords, may perform different actions, may have different TTS voices, and/or may have different feedback mechanisms—may allow a speech-processing configuration to provide a customer experience of having different "personalities" of different speech-processing configurations depending on (e.g.) the wakeword and request of a particular utterance.

In some situations, the user input includes a first wakeword associated with a first speech-processing configuration, but the command may be better handled by a second speech-processing configuration. In some instances, the first speech-processing configuration may determine that it is incapable of processing the command and/or performing an associated action. In these embodiments, the system is able to "hand off" utterances from one speech-processing configuration to another, while also, in some embodiments, indicating to the user that such a handoff has happened. For example, a local computing device may receive audio data corresponding to an utterance, determine a first wakeword represented in the utterance, and send audio data (and, in some embodiments, an indication of the wakeword) for the utterance to the remote system for processing. The remote system to which the audio data is sent may depend on the wakeword detected. Alternatively, the remote system may select different speech-processing configurations to process the utterance depending on the indicated wakeword and/or other input. The remote system may instead determine the wakeword or verify the representation of the wakeword.

The audio data may thus be sent to a first speech-processing configuration corresponding to the wakeword, which may process the audio data using ASR and/or NLU to determine an appropriate response to the command represented in the audio data. The first speech-processing configuration, however, may determine that the particular command is to be better handled by a second speech-processing configuration. Thus the request may be instead passed to the second-speech-processing configuration for processing and response. The user may be notified that the request is being passed to the second speech-processing configuration, for example in a TTS output in the speech style corresponding to the first speech-processing configuration saying that the request is being transferred or in a TTS output in the speech style of the second speech-processing configuration saying that the request was transferred. In some embodiments, the response may be generated by both speech-processing configuration if, for example, the command or request corresponds to a first application corresponding to the first speech-processing configuration and a second application corresponding to the second speech-processing component. Thus, even though the user may have intended to invoke the first speech-processing configuration, the request may be handled in full or in part by the second speech-processing configuration.

The system may inform the user that the command was passed from the first speech-processing configuration to the second speech-processing configuration. When the appropriate speech-processing component, such as an NLU component, generates response data corresponding to a response to the command from the user, the speech-processing component may include, in the response data, a first indication of the identity of the first speech-processing component, such as its name, a second indication of the identity of the second speech-processing component, such as its name, and/or indication of the passing from one component to the other. For example, the user may utter speech including a command and a wakeword, such as "Alexa," corresponding to a first, general-purpose speech-processing configuration, but the system may determine that the command should be or must be carried out by a second, specialized speech-processing configuration, such as a second speech-processing configuration for an automobile. If the utterance is, for example, "Alexa, roll down my window," the speech-processing configuration may determine that the first speech-processing component is not capable of rolling down the window and that the second speech-processing component is capable of rolling down the window. The speech-processing configuration may thus cause a local device to output audio that includes the name of the second speech-processing component, such as "SmartCar." For example, the output audio may be "SmartCar can handle that."

In various embodiments of the present disclosure, the response data may include different indications of the handoff to the second speech-processing configuration. A first indication may include a long indication of the handoff that includes a detailed (e.g., more verbose) description of the handoff. For example, this first indication may be "SmartCar can do that for you. I am handing you over to SmartCar." This first indication may be desirable to a user who is unfamiliar with the idea of the handoff to the second speech-processing configuration and who may be confused by the handoff. Such a user may be one who is new to (e.g., lacks experience in) use of the first and/or second speech-processing configurations. The user may further wish to not use, or limit use of, the second speech-processing configuration and may thus wish to be informed when the second speech-processing configuration is being used. The user may, for example, be concerned about the second speech-processing configuration having access to information about the user, such as a command history associated with the user.

The indications of the handoff may, however, be shorter. If the user frequently uses the second speech-processing configuration using commands that include the wakeword of the first speech-processing configuration, the longer indication may become less necessary because the user is familiar with the handoff, and the longer indication may become annoying to the user or otherwise undesirable. The shorter indication of the handoff may thus be, for example, "SmartCar can do that for you." Upon further use, the indication may become still shorter; for example, "OK, here's SmartCar." The indication may, in some embodiments, may not include a representation of the name of the second speech-processing configuration; for example, the indication may simply be "OK."

The length of the indication may correspond to an interaction score. The interaction score may be determined based on a number of interactions with the first speech-processing configuration, a number of interactions with the second speech-processing configuration, and/or a number of handoffs from one speech-processing configuration to the other. The interaction score may be higher (e.g., indicating a greater familiarity) as the number of interactions increases. The interaction score may further be based on the timing of the interactions; interactions that occurred more recently in time may increase the interaction score more than interactions that occurred less recently in time. The interaction score may further be based on feedback from the user; this feedback may be input to a user profile indicating a preference for longer or shorter indications. The feedback may instead or in addition be verbal feedback uttered by the user (e.g., "OK, I get it already") and/or non-verbal sounds by the user (e.g., "ugh") made during or after the command.

FIG. 1 illustrates a system configured to determine a response to a command or request represented in audio data in accordance with the present disclosure. Although the figures and discussion of the present disclosure illustrate certain operational steps of the system in a particular order, the steps described may be performed in a different order (as well as certain steps removed or added) without departing from the intent of the disclosure.

In various embodiments, a local user device 110 such as smart speaker 110a, a vehicle 110b, or other device communicates with a remote system 120 using a network 199. While FIG. 1 illustrates a smart speaker 110a and a vehicle 110b, the disclosure is not limited thereto, and the systems and methods described herein may be implemented using other local devices 110, such as smartphones, tablet computers, personal computers, or other devices. The system 120 receives (130) first audio data including a representation of utterance, the utterance including a representation of a wakeword and a representation of a command. The system 120 determines (132) that the wakeword is associated with a first speech-processing configuration. The system 120 determines (134) that the command is associated with a second speech-processing configuration. The system 120 determines a user account associated with the first audio data and determines (136), based at least in part on the user account, a score corresponding to interaction with a second speech-processing configuration. The system 120 determines (138), using the first speech-processing configuration and the score, first output data indicating that the command is associated with the second speech-processing configuration. The system 120 determines (140), using the second speech-processing configuration and the score, second output data corresponding to a response to the command.

The system may operate using various components as described in FIGS. 2A-2E. The various components may be located on same or different physical devices. Communication between various components may occur directly (via, e.g., a bus connection) or across a network(s) 199. Referring first to FIG. 2A, as described in greater detail below, the local device 110 may include a wakeword detector 220 for detecting one or more wakewords, a voice activity detector 222 for detecting an utterance, and/or one or more applications 224 for providing output and/or changing a state of the local device 110, such as illuminating a light.

An audio capture component(s), such as a microphone or array of microphones of the local device 110, captures input audio 11 and creates corresponding input audio data 211. A wakeword detector 220 of the local device 110 may process the input audio data 211 to determine whether speech is represented therein. The local device 110 may use various techniques to determine whether the input audio data 211 includes speech. In some examples, a voice-activity detector 222 of the local device 110 may apply voice-activity detection (VAD) techniques. Such techniques may determine whether speech is present in audio data based on various quantitative aspects of the input audio data 211, such as the spectral slope between one or more frames of the audio data; the energy levels of the audio data in one or more spectral bands; the signal-to-noise ratios of the audio data in one or more spectral bands; or other quantitative aspects. In other examples, the local device 110 may implement a classifier configured to distinguish speech from background noise. The classifier may be implemented by techniques such as linear classifiers, support vector machines, and decision trees. In still other examples, the local device local device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector 220 may determine that the input audio data 211 contains a representation of a wakeword (as described in greater detail below); the local device 110 may thereafter send the input audio data 211 and/or an indication of the wakeword to the system(s) 120. As described above, an example wakeword is "Alexa" or "SmartCar." The local device 110 may instead or in addition send the audio data to the system(s) 120 when an input detector detects an input—such as a key press, button press, or touch-screen touch. An example button is a "Push to Talk" button. In either event, the local device 110 sends the input audio data 211 and/or indication of the input to the server 120.

The wakeword detector 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

If the wakeword is detected by the wakeword detector 220 and/or input is detected by the input detector, the local device 110 may transmit the audio data 211 and/or indication of the wakeword or input to the system(s) 120. The input audio data 211 may include data corresponding to the wakeword; in other embodiments, the portion of the audio corresponding to the wakeword is removed by the local device 110 prior to sending the input audio data 211 to the system(s) 120. In the case of touch input detection, for example, the input audio data 211 may not include a wakeword.

Regarding the wakeword detector 220, Viterbi decoding may be performed for a competing foreground wakeword path and background speech/nonspeech path, and wakeword hypothesis may be triggered when a log-likelihood ratio of the foreground path versus the background path exceeds a predetermined threshold. Once the ratio exceed the predetermined threshold, features may be extracted from the audio data and fed into one or more second stage classifiers, which could be a support vector machine (SVM) or deep neural network (DNN).

In various embodiments, the wakeword detector 220 may use one of a plurality of wakeword-detection models. The wakeword detector 220 may, for example, be implemented on a digital signal processor (DSP) that includes an interface, such as an application-programming interface (API), that allows communication with another system or device. In some embodiments, the wakeword detector 220 includes a plurality of wakeword-detection models; in these embodiments, the other device or system sends a command, via the API, to instruct the wakeword detector 220 to use a different wakeword-detection model but need not send data corresponding to the model.

The local device 110 may select a new wakeword-detection model based on the location of the local device 110. The local device 110 may determine its location by processing input from one or more input devices. These input devices may include, for example, a camera, a microphone, an accelerometer, a gyroscope, a biometric sensor, a global positioning system (GPS), a thermometer, an antenna, or other such sensors. The local device 110 may instead or in addition determine its location by receiving location data from another device, such as the server 120.

The local device 110 may process input from multiple sensors to determine the location. For example, if the GPS or accelerometer of the local device 110 indicates a speed corresponding to travel in a vehicle, the local device 110 may process input from an additional sensor (e.g., a microphone or camera) to determine the type of vehicle and its corresponding location. If, for example, the audio data includes a representation of road noise but not a representation of speech from multiple speakers, the local device 110 may determine that the vehicle is an automobile and that the location is a private location. If, however, the audio data includes a representation of speech from multiple speakers, the local device 110 may determine that the vehicle is a bus or train and that the location is a public location. Similarly, the local device 110 may process image data captured by the camera and compare the captured image data to stored image data of automobiles and busses to determine the type of vehicle.

The wakeword-detection models may be implemented for their corresponding locations via training, as described herein, using location-specific training data. For example, the home-location wakeword-detection model may be trained using speech data corresponding to speech of a user and/or family member; home-location wakeword-detection model may instead or in addition be trained using speech data from other persons to, for example, distinguish between adult and child voices. The public-location wakeword-detection model may be trained using speech data corresponding to the wakeword being uttered in a noisy location. The wakeword-detection models corresponding to other locations may be trained using data corresponding to their locations.

In various embodiments, the wakeword-detection model of the wakeword detector 220 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector 220 may determine a similarity score for the candidate wakeword based on how similar it is to the stored wakeword; if the similarly score is higher than the wakeword-detection threshold, the wakeword detector 220 determines that the wakeword is present in the audio data, and if the similarity score is less than the wakeword-detection threshold, the wakeword detector 220 determines that the wakeword not is present in the audio data. For example, if the candidate wakeword matches the stored wakeword very closely, the wakeword detector 220 may determine a similarity score of 100; if the candidate wakeword does not match the stored wakeword at all, the wakeword detector 220 may determine a similarity score of 0. If the wakeword detector 220 determines candidate wakeword partially matches the stored wakeword, it may determine an intermediate similarity score, such as 75 or 85.

Though the disclosure herein describes a similarity score of zero to 100—wherein zero is least similar and 100 is most similar—and though the following examples carry through this type of similarity score, the present disclosure is not limited to any particular range of values of the similarity score, and any system or method of determining similarity between a candidate wakeword represented in captured audio data and a stored representation of the wakeword is within the scope of the present disclosure.

The local device 110 may also use different wakewords for different skills within a same speech-processing configuration. For example, a user may speak "SmartCar" as a special wakeword to invoke a specific skill or processing speech-processing configuration within a first speech-processing configuration (e.g., a speech-processing configuration that may otherwise be invoked by speaking "Alexa"). Use of the special "SmartCar" wakeword may result in different routing of the utterance through the first speech-processing configuration than use of another wakeword such as "Alexa." Thus the local device 110 using the techniques described herein may process incoming audio to determine a first confidence that a detected wakeword is a first wakeword associated with a first speech-processing configuration (which may be include first speech processing component (e.g., TTS component, skill, etc.) within the first speech-processing configuration) as well as determine a second confidence that the detected wakeword is a second wakeword associated with a second speech-processing configuration (which may be a second speech-processing configuration within the second speech-processing configuration. The different configuration may be associated with different ASR processing, different NLU processing, different TTS processing, different commands, or other differences.

Upon receipt by the system(s) 120, the input audio data 211 may be sent to an orchestrator component 240. The orchestrator component 240 may include memory and logic that enables the orchestrator component 240 to transmit various pieces and forms of data to various components of the system 120, as well as perform other operations as described herein.

The orchestrator component 240 may, for example, send the input audio data 211 to a speech-processing configuration manager 294 and/or one or more of the speech-processing configuration 292, which may be used to determine which, if any, of the ASR 250, NLU 260, and/or TTS 280 components should receive and/or process the audio data 211. In some embodiments, the speech-processing configuration manager 294 includes one or more ASR components 250, NLU components 260, TTS components 280, and/or other processing components, and processes the input audio data 211 before sending it and/or other data to one or more speech-processing components 292 for further processing. In other embodiments, the orchestrator component 240 sends the input audio data 211 directly to one or more of the speech-processing configuration 292 for processing.

As described above, the speech-processing configuration manager 294 (and/or one or more of the speech-processing configurations 292) may determine that the input audio data 211 includes a representation of a wakeword associated with a first speech processing configuration 292a and a command associated with a second speech-processing configuration 292b. For example, the wakeword may be "Alexa," and the command may be "roll down my window." The wakeword "Alexa" may be associated with a first speech-processing configuration 292a, while the command "roll down my window" may be associated with a second speech-processing configuration 292b. The first speech-processing configuration 292a may generate output data that includes acknowledgement of receipt of the input audio data 211 and/or an indication that the second speech-processing configuration 292b will further process the input audio data 211. The second speech-processing configuration 292b may further process the input audio data 211 and determine response data, which may include additional audio data and/or other data corresponding to an action related to the response. The system 120 may send response audio data 212 that includes the indication and/or additional audio data to the local device 110, which may output corresponding output audio 12. The system 120 may further send additional data to the local device 110 corresponding to an action responsive to the input audio data 211, such as a command to roll down the window of the vehicle.

As described above, the indication that the second speech-processing configuration 292b will further process the input audio data 211 may vary. If, for example, a user has a low level of interaction with the second speech-processing configuration 292b, the indication may be long and include information such as the name of the second speech-processing configuration 292b, an explanation of the handoff to the second speech-processing configuration 292b, and/or additional capabilities of the second speech-processing configuration 292b. If the user has a medium level of interaction with the second speech-processing configuration 292b, the indication may be shorter and omit some of that information, such as the additional capabilities of the second speech-processing configuration 292b. If the user has a high level of interaction with the second speech-processing configuration 292b, the indication may be brief and include only the name of the second speech-processing configuration 292b or, in some embodiments, omit even the name and any indication of the handoff. The score may be, for example, between 1 and 5, wherein 1 represents a low amount of interaction and 5 represents a high degree of interaction.

The speech-processing configuration manager 294 (and/or one or more of the speech-processing configurations 292) may thus include an interaction determination component 296 that determines an interaction score corresponding to an amount of previous interaction(s) between a speaker and the second speech-processing configuration 292b. The interaction determination component 296 may determine that a profile is associated with the input audio data 211 using, as described in greater detail below, a speaker-recognition component 295. The profile may indicate historical interaction with the second speech-processing configuration 292b; this history may include a number of times that the system 120 has received input audio data corresponding to a particular command associated with the second speech-processing configuration 292b. Each indication of receipt may further include a time of receipt of the command. The history may further include a number of times, and times of receipt, of other interactions with the second speech-processing configuration that included other commands.

The interaction determination component 296 may thus determine the interaction score based on the number of times that the command has been previously received; more receipts may mean a higher score. For example, if the command has been received less than 5 times, the score may be 1; between 5 and 10 times may mean a score of 2; and so on. The interaction determination component 296 may further determine the score based on the number of times that different but related commands have been received. The related commands may be related because they are also associated with the second speech-processing configuration 292b or because they are similar in function. The interaction determination component 296 may determine that related commands have less influence on the score than receipt of the actual command does. For example, the score may be 2 if a related command is received between 10 and 15 times (as opposed to a score of 2 for receipt of the actual command between 5 and 10 times).

The interaction determination component 296 may further determine the score based on the timing of receipt of the commands or related commands. The interaction determination component 296 may determine a time of receipt of a previously received command, the time of receipt of a present command, and then compare the difference to a threshold. If the difference is greater than the threshold, the interaction determination component 296 may not change the score based on the previously received command. The interaction determination component 296 may instead or in addition weight the effect of a previously received command on the score in accordance with how recently the command was received, wherein more recently received commands have a greater effect on the score than less recently received commands. The interaction determination component 296 may decrease the score from a previous, higher value if an amount of time greater than the threshold has elapsed. Thus, if a user hasn't used the command in an amount of time greater than the threshold, the interaction determination component 296 will generate a score indicating a longer indication of the handoff to account for the fact that the user may have forgotten the use of the second speech-processing configuration 292b.

In some embodiments, the interaction determination component 296 adjusts the score based on one or more additional factors. For example, the score may be increased if the interaction determination component 296 determines that the audio data represents an urgent request, such as a call for an ambulance. Similarly, the interaction determination component 296 may increase the score if it determines that an emotional state of a user is excited, upset, or otherwise other than calm. The interaction determination component 296 may lower the score if it determines that an age of the user is very young (e.g., less than 8) or very old (e.g., older than 80).

After the interaction determination component 296 determines the score, it may send the score to one or more speech-processing configuration 292 and/or skills 290. The speech-processing configuration manager 294, speech-processing configuration 292, and/or skills 290 may then generate text that includes a description of the handoff in accordance with the score. Generation of this text may include selecting text corresponding to the score from a predetermined set of candidate responses and/or determining the text using a speech model. A TTS component 280 may generate speech using this text, and associated response audio data 212 may be sent to the local device 110 to be output as output audio 12. The second speech-processing component 292 may thereafter process the input audio data

211 to determine further response data, which may be similarly sent to the local device 110. In some embodiments, the output data corresponding to the handover indication and the output data corresponding to the response are combined before sending to the local device 110.

A permission determination component 297 may first determine whether a grant of permission is required for the second speech-processing component 292a to process the input audio data 211. This requirement may be based on whether the input audio data 211 includes any information that the user may wish to be protected, such as names, addresses, or account numbers. The requirement may also or instead be based on the type of the second speech-processing configuration 292a, such as whether it has access to personal information or bank accounts. The permission determination component 297 may further determine if the user has granted permission for the second speech-processing component 292a to process the input audio data 211. The user account may include an indication of the grant, which may be a grant limited to only one or a subset of the speech-processing configuration 292. If the grant is required but no indication is present in the user account, the permission determination component 297 may cause the system 120 and/or local device 110 to prompt the user and ask for permission. If the user acquiesces, the second speech-processing configuration 292b processes the input audio data 211 as described above. If the user declines, an error is returned; the error may be, for example, audio indicating that the command cannot be carried out.

The interaction determination component 296 may update a user profile of the user to reflect receipt of the command and the outputting of the indication of the handover. The speaker-recognition component 295 may further indicate the presence of a second user proximate the local device 110 by processing the input audio data 211. The input audio data 211 may include, for example, a representation of second speech of the second user and/or other noises that identify the second user. The interaction determination component 296 may thus determine that the second user also hears output audio 12 that describes the handoff to the second speech-processing configuration 292b and may thus update a second user profile of the second user to reflect this hearing. When and if the second user utters a command that involves a handoff to the second speech-processing configuration 292b, the score computed for the second user may be based at least in part on this second-hand interaction. This second-hand interaction of the indication may, however, have less of an effect on computing an interaction score for the second user than the above-described first-hand interaction. For example, if a first-hand interaction affect the score with a weight of 1.0, a second-hand interaction may affect the score with a weight of 0.5 (e.g., carry half the weight of a first-hand interaction).

The first speech-processing configuration 292a may control, have access to, or otherwise be associated with a first set of skills, applications, and speech styles, and the second speech-processing configuration 292b may control, have access to, or otherwise be associated with a second set of skills, applications, and speech styles. The first and second set of skills may include common skills as well as skills exclusive to each speech-processing configuration 292. In some embodiments, a first speech-processing configuration 292a is a general-purpose speech-processing configuration and may provide such skills and applications as weather forecasts, restaurant reservations, shopping services, and Internet searches; a second speech-processing configuration 292b is a vehicle-specific speech-processing configuration and may provide such skills and applications as changing a state of the local device 110 (e.g., raising/lowering a window, setting a thermostat, and adjusting a seat) and/or providing diagnostic information. Some applications and skills may be common to both speech-processing configuration 292 (e.g., playing music or providing navigation information). Any number of speech-processing configuration 292, however, having any type of applications or skills is within the scope of the present disclosure.

The speech-processing configuration manager 294 directs processing of the input audio data 211 using, in some embodiments, one or more components in a speech-processing configuration 292, such as an ASR component 250 and an NLU component 260. In other embodiments, the speech-processing configuration manager 294 includes an NLU component for NLU processing; this built-in NLU may be used to process all audio data, while different NLU components 260 in the speech-processing configuration 292 may be used to process different audio data (and may be selected based on a wakeword detected in the audio data). As explained in greater detail below, the speech-processing configuration manager 294 and/or speech-processing configuration 292 may perform ASR and/or NLU processing to determine a domain, intent, and/or meaning corresponding to the audio data 211. The speech-processing configuration manager 294 and/or speech-processing configuration 292 may instead or in addition identify keywords in the input audio data 211 and identify a domain, intent, and/or meaning corresponding to the keywords. The speech-processing configuration manager 294 and/or speech-processing configuration 292 may further identify a user associated with an utterance in the input audio data 211 and identify a domain, intent, and/or meaning corresponding to the user. The speech-processing configuration manager 294 and/or speech-processing configuration 292 may further identify a domain, intent, and/or meaning associated with the input audio data 211 based on information in a user profile associated with the user (such as usage history information), a location of the local device 110, a time of day, week, month, or year, and/or temperature information.

The speech-processing configuration manager 294 and/or speech-processing configuration 292 may compare a determined domain, intent, and/or meaning to a list of corresponding applications or skills associated with each speech-processing configuration 292. The comparison may include determining a number of whole or partial matches of the domain, intent, and/or meaning present in each list. The speech-processing configuration manager 294 and/or speech-processing configuration 292 may determine a score for each speech-processing configuration 292 corresponding to the ability of each speech-processing configuration 292 to respond to a command or request represented in the input audio data 211. If the domain, intent, and/or meaning is determined to be associated with a first speech-processing configuration 292 but not with a second speech-processing configuration 292, the speech-processing configuration manager 294 may award the first speech-processing configuration 292 a higher score than the second speech-processing configuration 292. If the domain, intent, and/or meaning is determined to be associated both the first speech-processing configuration 292 and the second speech-processing configuration 292, the speech-processing configuration manager 294 may determine the ranking based on other data, such as user identification, user profile data, location, or other information.

In some embodiments, the orchestrator 240 and/or speech-processing configuration manager 294 communicate with the speech-processing configurations 292 using an application programming interface (API). The API may be used to send and/or receive data, commands, or other information to and/or from the speech-processing configurations 292. For example, the orchestrator 240 may send, via the API, the input audio data 211 to a speech-processing systems elected by the speech-processing configuration manager 294 and may receive, from the selected speech-processing configuration 292, a command and/or data responsive to the audio data 211.

In some embodiments, as described above, the speech-processing configuration manager 294 includes processing components, such as ASR and/or NLU components, that may be used to select a speech-processing configuration 292. Alternatively or in addition, in other embodiments, the speech-processing configuration manager 294 communicates, via the API, with a particular speech-processing configuration 292 to cause the speech-processing configuration 292 to perform the processing, and receives in response data corresponding to the processing and/or a selected speech-processing configuration 292. The speech-processing configuration manager 294 may include, for example, one or more application programming interfaces (APIs) for communicating with a particular speech-processing configuration 292, a configuration manager for determining properties of the local device 110, and/or an event handler for handling events received from the local device 110 and/or speech pipelines 292, but may not include an ASR processor or an NLU processor, which may be instead included in a particular speech-processing configuration 292.

After the speech-processing configuration manager 294 selects one or more speech-processing system(s) 292, the orchestrator component 240 may send the input audio data 211 to the corresponding speech-processing system(s) 292. Each speech-processing configuration 292 may include an ASR component 250, which may transcribe the input audio data 211 into text data. The text data output by the ASR component 250 represents one or more than one (e.g., in the form of an N-best list) ASR hypotheses representing speech represented in the input audio data 211. The ASR component 250 interprets the speech in the input audio data 211 based on a similarity between the audio data 211 and pre-established language models. For example, the ASR component 250 may compare the input audio data 211 with models for sounds (e.g., acoustic units such as phonemes, senons, phones, etc.) and sequences of sounds to identify words that match the sequence of sounds of the speech represented in the input audio data 211. The ASR component 250 sends the text data generated thereby to an NLU component 260, via, in some embodiments, the orchestrator component 240. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

Each speech-processing configuration 292 may further include a NLU component 260 that attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the local device 110, the system(s) 120, a skill component 290, a skill system(s) 225, etc.) to execute the intent. For example, if the text data corresponds to "play Africa by Toto," the NLU component 260 may determine an intent that the system output music and may identify "Toto" as an artist and "Africa" as the song. For further example, if the text data corresponds to "what is the weather," the NLU component 260 may determine an intent that the system output weather information associated with a geographic location of the local device 110. In another example, if the text data corresponds to "turn off the lights," the NLU component 260 may determine an intent that the system turn off lights associated with the local device 110 or the user 5.

The NLU results data may be sent from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis.

A "skill component" may be software running on the system(s) 120 that is akin to a software application. That is, a skill component 290 may enable the system(s) 120 to execute specific functionality in order to provide data or produce some other requested output. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the local device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill system(s) 225 may communicate with a skill component(s) 290 within the system(s) 120 and/or directly with the orchestrator component 240 or with other components. A skill system(s) 225 may be configured to perform one or more actions. An ability to perform such action(s) may sometimes be referred to as a "skill." That is, a skill may enable a skill system(s) 225 to execute specific functionality in order to provide data or perform some other action requested by a user. For example, a weather service skill may enable a skill service(s) 225 to provide weather information to the system(s) 120, a car service skill may enable a skill system(s) 225 to book a trip with respect to a taxi or ride sharing service, an order pizza skill may enable a skill system(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 290 dedicated to interacting with the skill system(s) 225. Unless expressly stated otherwise, reference to a skill, skill device, or skill component may include a skill component 290 operated by the system(s) 120 and/or skill operated by the skill system(s) 225. Moreover, the functionality described herein as a skill or skill may be referred to using many different terms, such as an action, bot, app, or the like.

The speech-processing configuration manager 294 and/or each speech-processing configuration 292 may include a TTS component 280 that generates audio data (e.g., synthesized speech) from text data using one or more different methods. Text data input to the TTS component 280 may come from a skill component 290, the orchestrator component 240, or another component of the system. The text data may include an indication of a handoff, if any, and/or data responsive to a command.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include a speaker-recognition component 295 that recognizes one or more speakers associated with data input to the system. The speaker-recognition component 295 may further identify that a recognized speaker is also associated with a user account. If the speaker-recognition component 295 is unable to identify an associated user account either because a speaker did not create such a user account or because the speaker-recognition component 295 does not have enough input data to determine the user account, the speaker-recognition component 295 may identify or create a speaker account associated with the identified speaker. The speaker account may include data representing past interactions of the recognized speaker with a local device 110 and/or system 120, such as past utterances or locations. When and if the speaker-recognition component 295 identifies a user account associated with the recognized speaker, the speaker-recognition component 295 may merge some or all of the data associated with the speaker account with the user account.

The speaker-recognition component 295 may take as input the audio data 211 and/or text data output by the ASR component 250. The speaker-recognition component 295 may perform speaker-recognition by comparing audio characteristics in the input audio data 211 to stored audio characteristics of users or speakers. The speaker-recognition component 295 may also perform speaker-recognition by comparing biometric data (e.g., fingerprint data, iris data, etc.), received by the system in correlation with the present speaker input, to stored biometric data of users and/or previous speakers. The speaker-recognition component 295 may further perform speaker-recognition by comparing image data (e.g., including a representation of at least a feature of a speaker), received by the system in correlation with the present user input, with stored image data including representations of features of different speaker. The speaker-recognition component 295 may perform additional speaker-recognition processes.

The speaker-recognition component 295 determines scores indicating whether speaker input originated from a particular speaker. For example, a first score may indicate a likelihood that the user input originated from a first speaker, a second score may indicate a likelihood that the user input originated from a second speaker, etc. The speaker-recognition component 295 also determines an overall confidence regarding the accuracy of speaker-recognition operations.

Output of the speaker-recognition component 295 may include a single speaker identifier corresponding to the most likely speaker that originated the user input. Alternatively, output of the speaker-recognition component 295 may include an N-best list of speaker identifiers with respective scores indicating likelihoods of respective users originating the user input. The output of the user-recognition component 295 may be used to inform NLU processing as well as processing performed by other components of the system. As described above, the interaction determination component 296 may use this user identifier to identify a user account in the profile storage 270.

The system(s) 120 may include profile storage 270. The profile storage 270 may include a variety of information related to individual speakers, groups of speakers, users, groups of users, devices, etc. that interact with the system. A "profile" refers to a set of data associated with a speaker, user, device, etc. The data of a profile may include preferences specific to the speaker, user, device, etc.; input and output capabilities of the device; internet connectivity information; user bibliographic information; subscription information, as well as other information.

The profile storage 270 may include one or more speaker and/or user profiles, with each speaker and/or user profile being associated with a different speaker and/or user identifier. Each speaker and/or user profile may include various user identifying information. Each speaker and/or user profile may also include preferences of the speaker, user, and/or one or more device identifiers, representing one or more devices of the user. When a user logs into to an application installed on a local device 110, the user profile (associated with the presented login information) may be updated to include information about the local device 110. As described, the profile storage 270 may further include data that shows an interaction history of a speaker and/or user, including commands and times of receipt of commands. The profile storage 270 may further include data that shows when a second speaker and/or user was present to hear an indication of a handoff for a command uttered by a first user.

The profile storage 270 may include one or more group profiles. Each group profile may be associated with a different group identifier. A group profile may be specific to a group of speakers and/or users. That is, a group profile may be associated with two or more individual speaker and/or user profiles. For example, a group profile may be a household profile that is associated with speaker and/or user profiles associated with multiple users of a single household. A group profile may include preferences shared by all the speaker and/or user profiles associated therewith. Each speaker and/or user profile associated with a group profile may additionally include preferences specific to the speaker and/or user associated therewith. That is, each speaker and/or user profile may include preferences unique from one or more other user profiles associated with the same group profile. A speaker and/or user profile may be a stand-alone profile or may be associated with a group profile.

The profile storage 270 may include one or more device profiles. Each device profile may be associated with a different device identifier. Each device profile may include various device identifying information. Each device profile may also include one or more speaker and/or user identifiers, representing one or more speakers and/or users associated with the device. For example, a household device's profile may include the user identifiers of users of the household.

The system may be configured to incorporate user permissions and may only perform activities disclosed herein if approved by a user. As described above, these permissions may include a grant (or denial) to use a particular speech-processing configuration 292. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 2B, 2C, 2D, and 2E illustrate further embodiments of the present disclosure. In FIG. 2B, the speech-processing configuration(s) 292w includes a single ASR component 250 that processes the input audio data 211 and a single NLU component 260 that processes the output of the ASR component 250. The speech-processing configuration(s) 292w include, however, a plurality of TTS components 280 each associated with a different speech-processing configuration. A first TTS component 280 may be used to generate response audio data 212 associated with a first speech-processing configuration, such as one associated with a first wakeword "Alexa," while a second TTS component 280 may be used to generate response audio data 212 associated with a second wakeword "SmartCar." The speech-processing configuration(s) 292w may similarly include additional TTS components 280 associated with other speech-processing configurations.

Figure 2C:
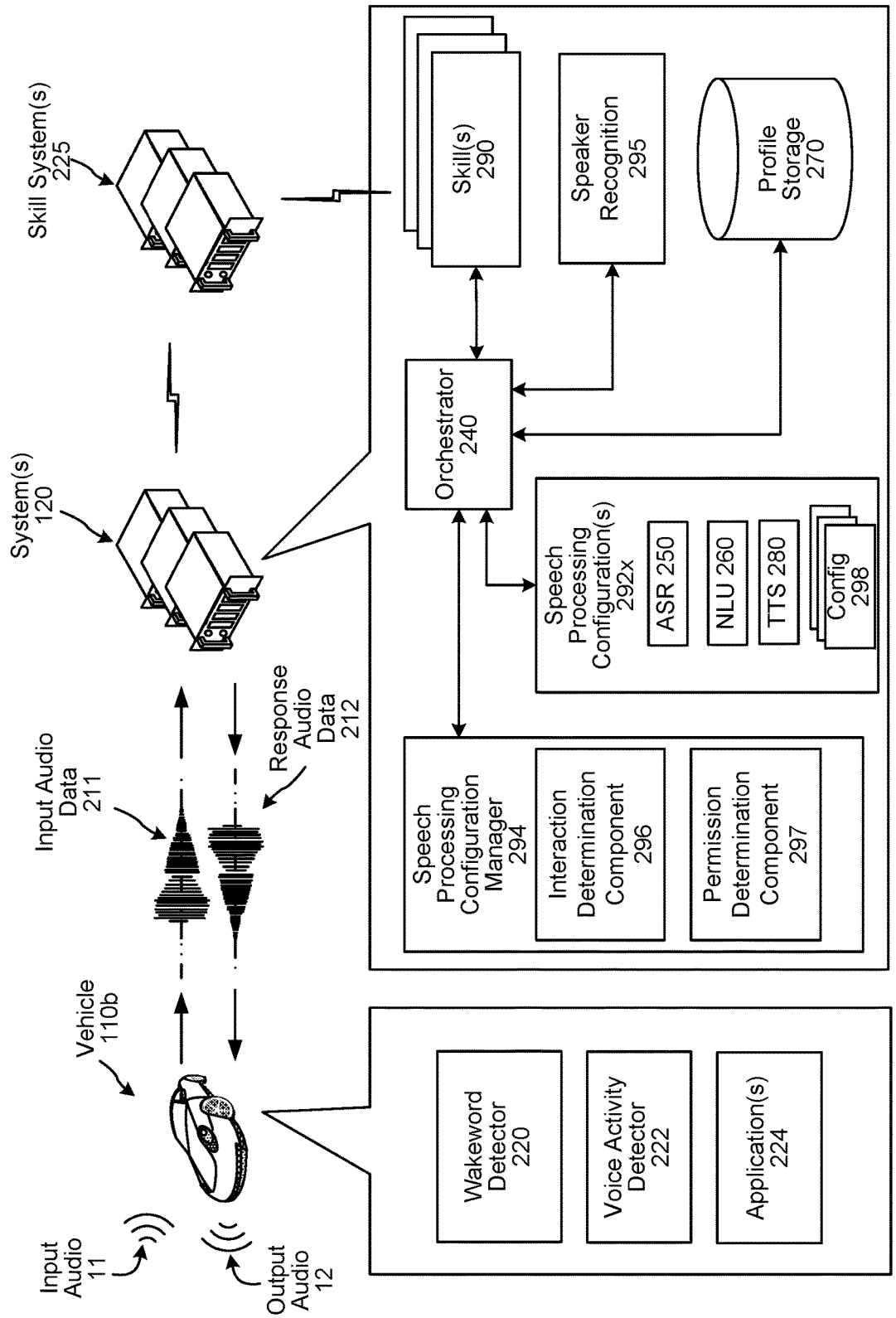

Referring to FIG. 2C, the speech-processing configuration(s) 292x may include a single TTS component 280 but multiple configuration profiles 298 that configure the TTS component 280 for different speech-processing configurations. Each configuration profile 298 may include configuration data such as TTS model weights or TTS model inputs that configure or instruct a TTS model to generate response audio data 212 in accordance with a particular speech-processing configuration. For example, a first configuration profile 298 may be associated with a first speech-processing configuration associated with a first wakeword such as "Alexa," while a second configuration profile 298 may be associated with a second speech-processing configuration associated with a first wakeword such as "SmartCar." In some embodiments, the speech-processing configuration 292x includes multiple TTS components 280, such as in the embodiments described above with reference to FIG. 2A, but one or more of the TTS components 280 are configured using two or more configuration profiles 298.

Figure 2D:
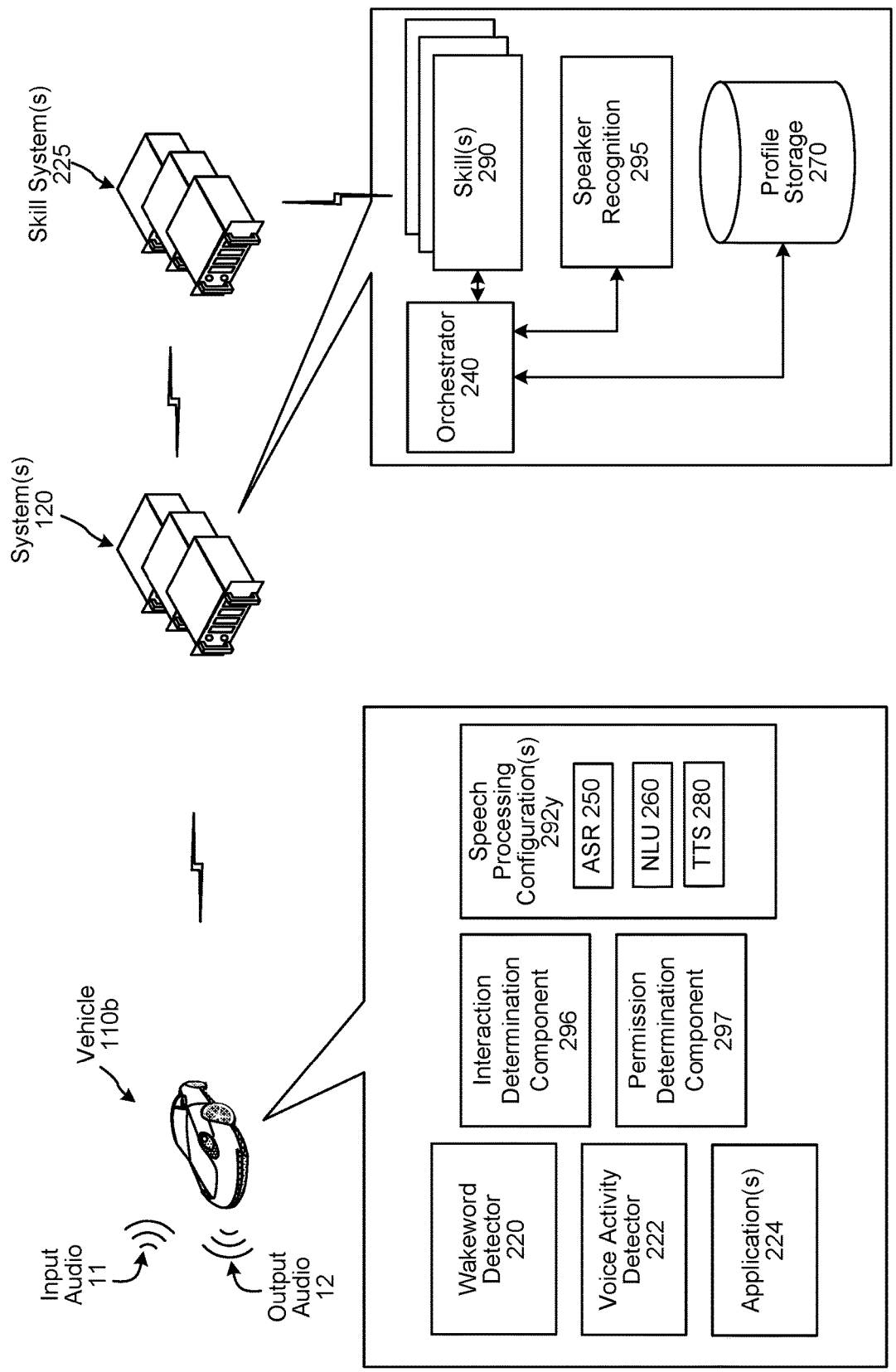
Figure 2E:
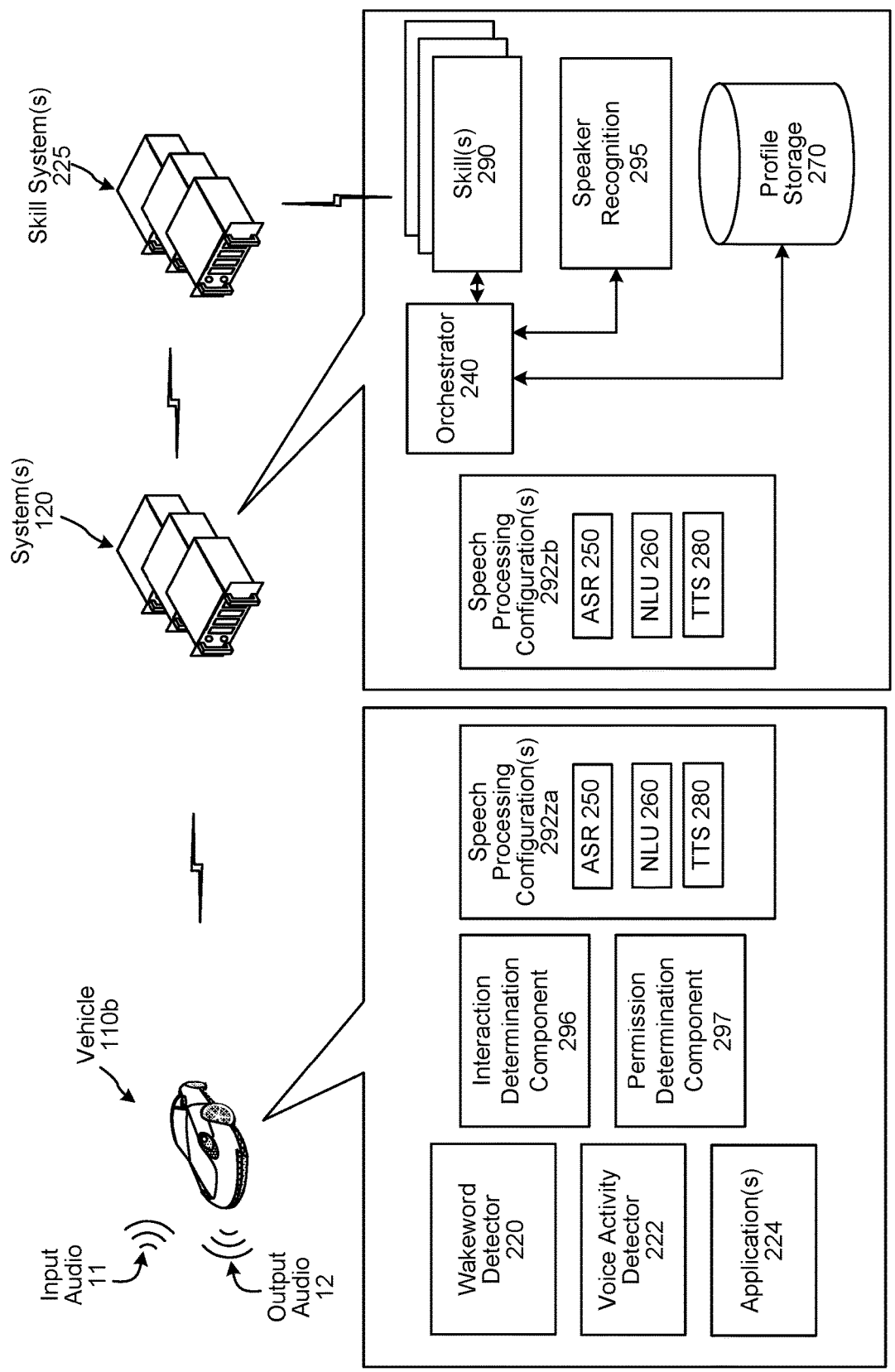

Referring to FIG. 2D, some or all of the processing described above may be performed by the device 110. For example, the interaction determination component 296, permission determination component 297, and/or speech-processing configuration 292y may be disposed in the local device 110. In still other embodiments, with reference to FIG. 2E, some or all of these components (such as the interaction determination component 296, permission determination component 297, and/or speech-processing configuration 292za) may be present both on the local device 110, and others of these components (such as the speech-processing configuration 292zb) may also be present on the remote system 120.

Figure 3:
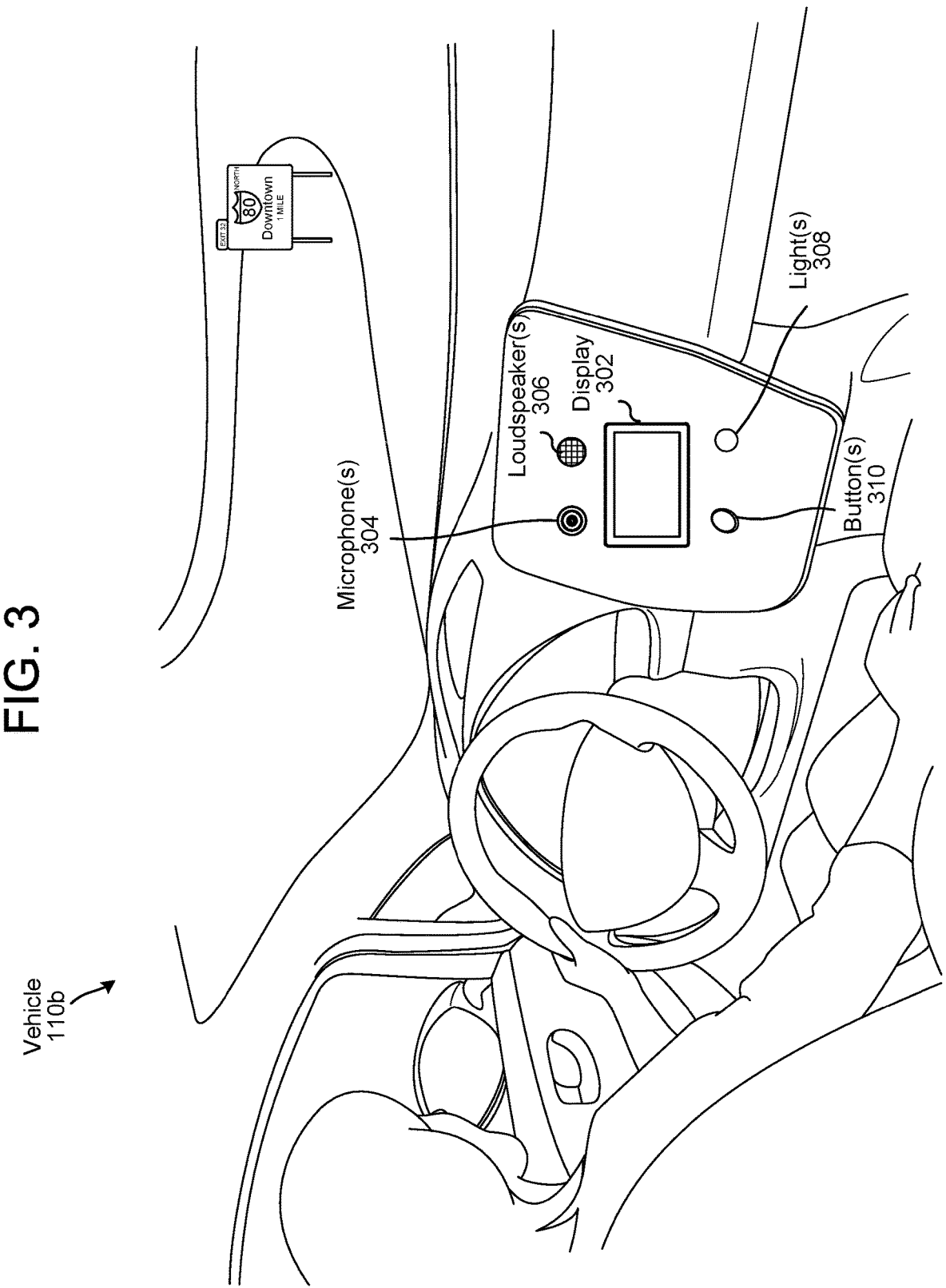
FIG. 3 illustrates a vehicle-based user interface according to embodiments of the present disclosure.

FIG. 3 illustrates an interior of the vehicle 110a. The vehicle 110a may include, on a dashboard, steering wheel, heads-up display, or other interior surface or feature, such as a display 302, which may be a touchscreen display. The vehicle 110a may further include one or more microphones 304, which may be used to receive audio that includes an utterance and generate corresponding input audio data. One or more loudspeakers 306 may be used to output audio corresponding to output audio data, which may be received from the system 120. One or more lights 308 may be used to display information; in some embodiments, the lights 308 are used to identify a speech-processing system being used to provide output audio and/or perform a task. For example, one light 308 may be illuminated when a first speech-processing system is being used to output audio and/or perform an action, and a second light 308 may be illuminated when a second speech-processing system is being used. In another example, a light 308 is illuminated using a first color (e.g., blue) when a first speech-processing system is being used, and same light 308 is illuminated using a second color (e.g., green) when a second speech-processing system is being used. The vehicle 110a may further include one or more buttons 310, dials, switches, triggers, or other such user-input devices. In some embodiments, when the vehicle 110a detects activation of a button 310 and/or touching of the display 302, the microphone 304 captures audio, and the vehicle 110a sends corresponding audio data to the system 120. In other embodiments, the vehicle 110a continually receives audio data captured by the loudspeaker 306 and sends corresponding audio data to the system 120 when the vehicle 110a detects a wakeword in the audio data (as described in greater detail below).

Figure 4B:
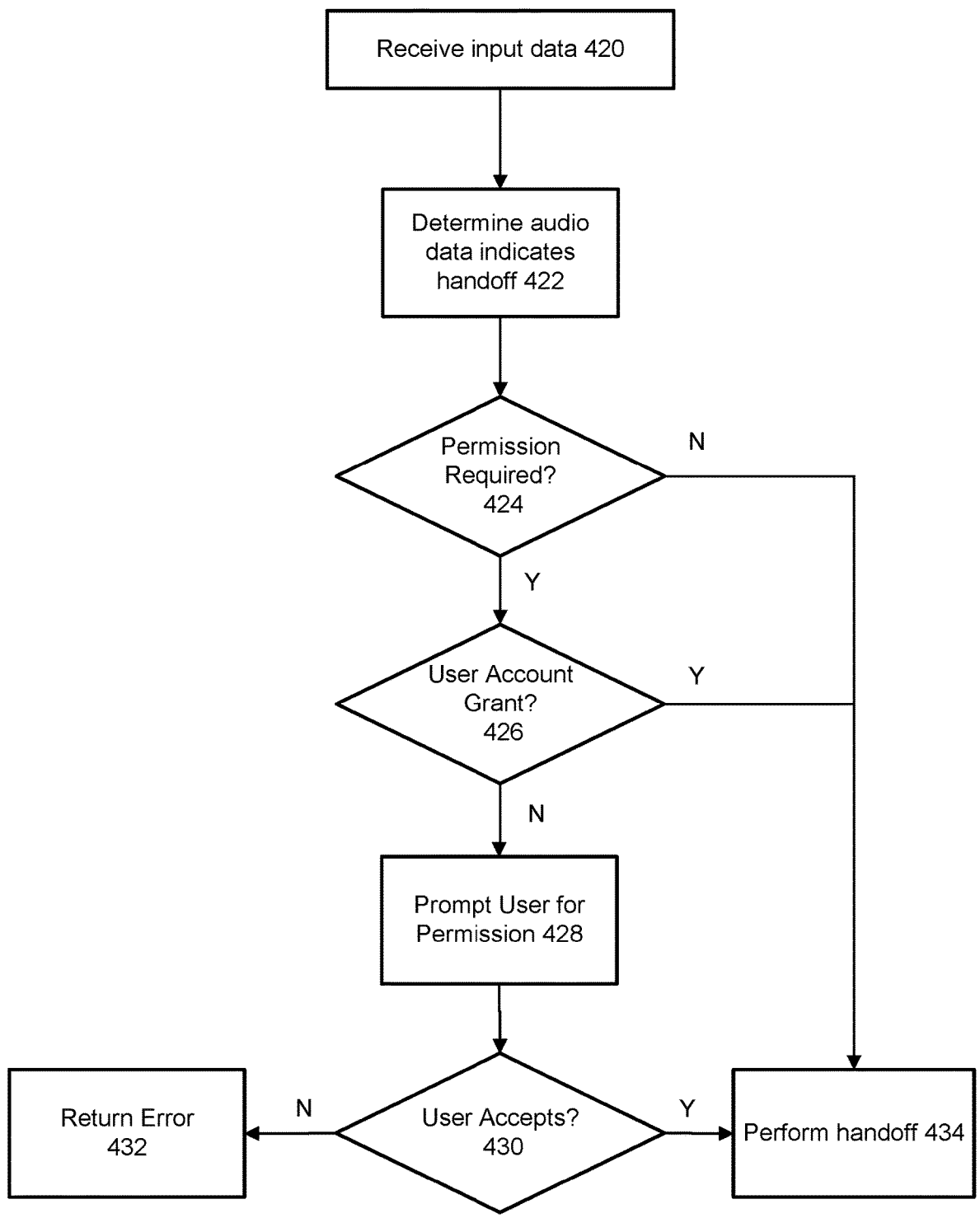

FIGS. 4A, 4B, 4C, and 4D are flow diagrams illustrating speech-processing system selection according to embodiments of the present disclosure. Referring first to FIG. 4A, the system 120 receives (402), from a local device 110, input data, which may be text data, gesture data, or audio data 211. Using the techniques described herein, the local device 110 and/or system 120 determines that the input data 211 corresponds to a first speech-processing configuration; this determination may include determining that the audio data 211 includes a representation of a wakeword. A speech-processing configuration 292 is selected (404) based on the determination of the configuration; if, for example, the wakeword is associated with a first speech-processing configuration, the first speech processing system configuration (406) the input data. Similarly, if the wakeword is associated with a second speech-configuration system, the second speech processing system processes (408) the input data.

The first speech-processing configuration may thus determine (412) first response data, and the second speech-processing configuration may determine (414) second response data. The response data may be text data, audio data, or other data. The system 120 may determine (410) that, though the input data corresponds to a first speech-processing configuration, the input data should be further processed by the second speech-processing configuration. The system 120 may thus determine (416) an amount of historical interaction between the user and the second speech-processing configuration, which may (as described herein) include determining an interaction score representing the amount of interaction. The system 120 may then determine (418) an indication of the handoff in accordance with the interaction score, as described herein, which may be output using the local device 110. The system 120 may then direct the second speech-processing configuration to process the input data and determine the response.

FIG. 4A illustrates a handoff from a first speech-processing configuration to a second speech-processing configuration. In some embodiments, a second handoff may occur back from the second speech-processing configuration to the first speech-processing configuration. This second handoff may be include determination and output of a corresponding second indication. The system 120 may determine a corresponding interaction score indicating historical interaction with the first speech-processing configuration; the indication of the second handoff may be based thereon, as described herein.

In some embodiments, the system 120 determines an indication from the second speech-processing configuration that the first speech-processing configuration determined to perform the handoff. This indication may be similarly determined using the first interaction score or another interaction score.

FIG. 4B illustrates a method for checking user permission. The input data is received (420), and the system determines (422) that a handoff to the second speech-processing configuration is required. The system 120 may then determine (424) whether permission is required to use the second speech-processing configuration (as described herein). If not, the handoff is performed (634). If so, the system 120 determines (426) if the user has granted permission by examining, for example, a user profile. If not, the system 120 prompts (428) the user for permission. If the user does not accept (430), the system 120 returns an error (432). If the user account indicates the grant, however, or if the user acquiesces to the prompt the handoff is performed (434).

Figure 4C:
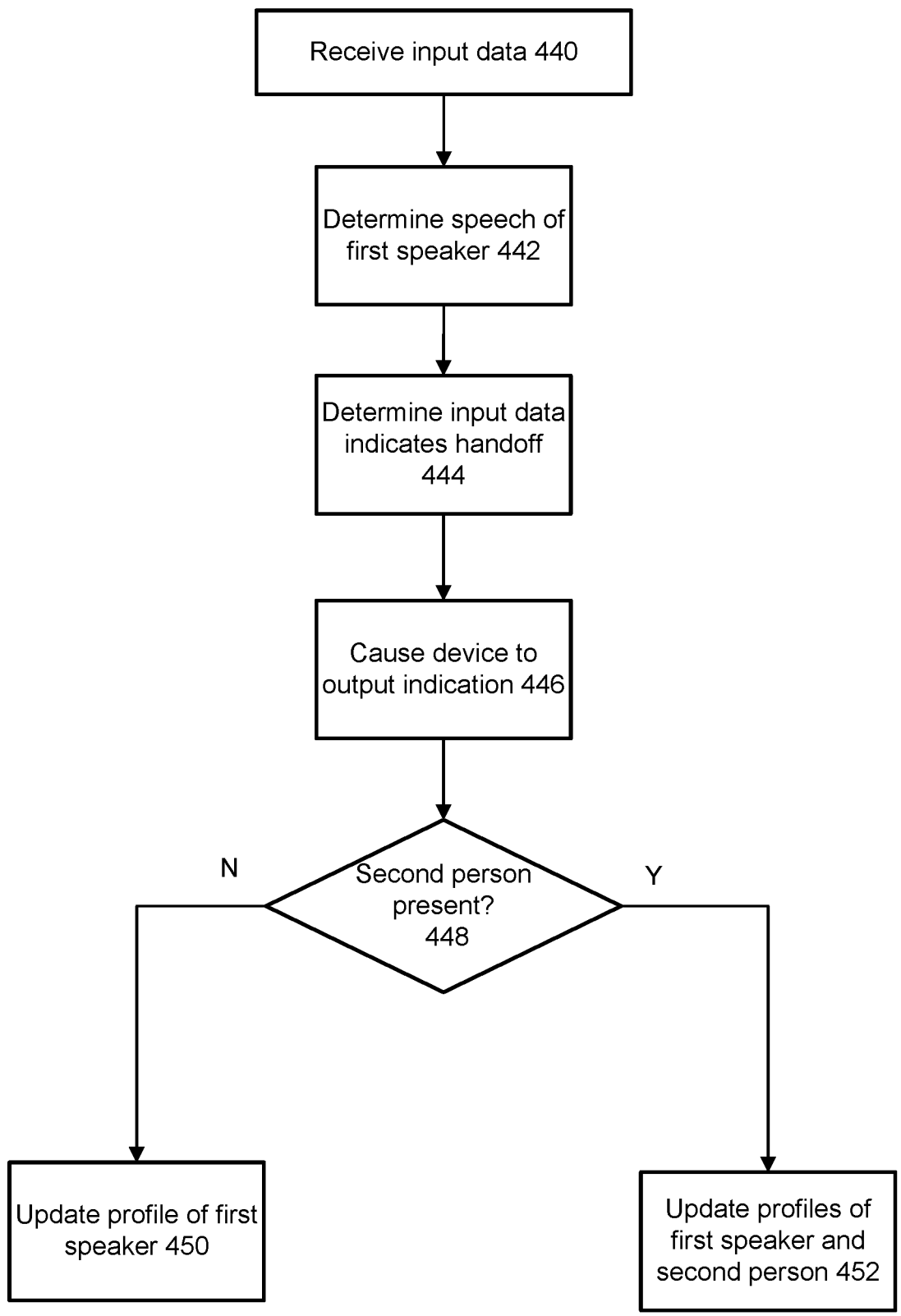

FIG. 4C illustrates a method of updating a profile of a second person when a first speaker interacts with the system 120. The first speaker and second person may have corresponding first and second user profiles. If said user accounts are not present or cannot be determined, the system 120 may identify or create first and second speaker profile. The input data is received (440), and the system determines (442) that it includes speech of the first speaker. The system 120 also, as described herein, determines that the input data indicates (444) a handoff from a first speech-processing configuration to a second speech-processing configuration. The system 120 causes the local device 110 to output (446) an indication of the handoff. A profile associated with the first speaker may be updated (450) to reflect this output. As described above, the system 120 may further determine (448) that a second person is proximate the local device 110 by determining that audio data indicates second speech (and/or non-speech sounds) of the second person or that other data, such as biometric data or wireless data, indicates presence of the second person. The biometric data may be, for example, heartbeat information. The wireless data may indicate presence of a wireless device proximate the local device 110. The system 120 may thus also update (452) a second profile associated with the second person to indicate the output of the indication.

Figure 4D:
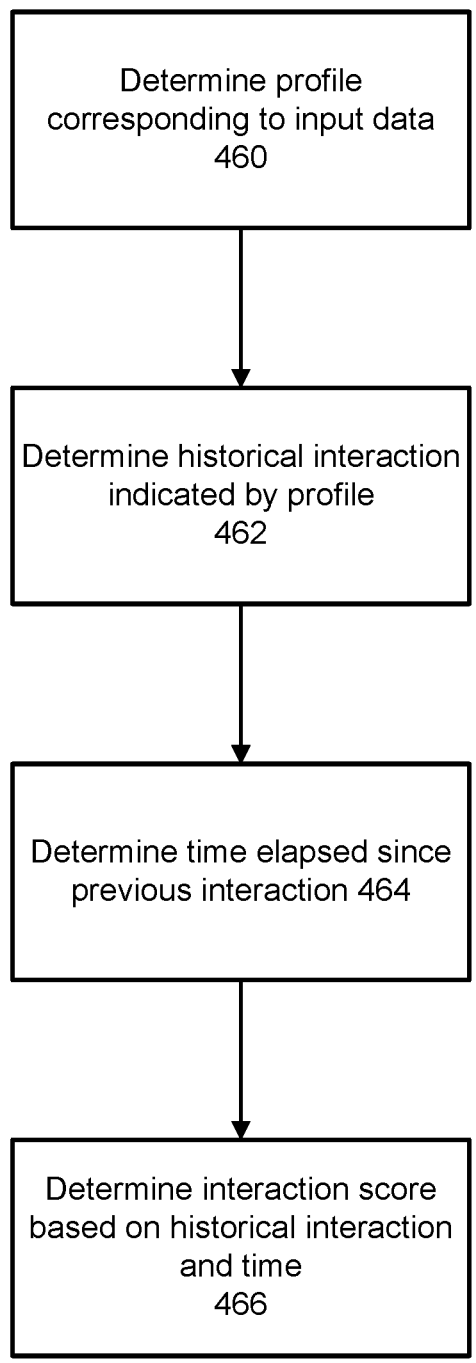

FIG. 4D illustrates a method of determining an interaction score according to embodiments of the present disclosure. In a first step, the system 120 determines (460) that input data corresponds to a profile. The system 120 may, for example, have received data from the local device 110 corresponding to a username or user identification information of a user of the local device 110 and identify the profile using the username or user identification information. The system 120 may instead or in addition perform speaker identification using input audio data and determine one or more vocal characteristics represented by the audio data; the profile may include the vocal characteristics and may be determined based thereon. As explained above, the input data may further indicate presence of one or more other persons proximate the device 110.

The system 120 then determines (462) historical interaction indicated by the profile. As described herein, this historical interaction may include a number of times that a user of the device 110 has interacted with the second speech-processing configuration and/or a number of times that the user has issued a particular (and/or similar) command to the speech-processing configuration. The historical information may include interactions using the device 110 or other device. The historical interaction may include direct uses of the second speech-processing configuration (that were not, for example, handed off from the first speech-processing configuration). The system 120 may further determine (464) an amount of time that has elapsed since one or more previous interaction(s), if any.

The interaction determination component 296 may then use the historical interaction(s) and/or time elapsed to determine (466) the interaction score. The interaction score may be determined using an equation; the interaction determination component 296 may process these inputs using the equation to determine the interaction score. For example, a prior interaction may contribute to the score based on its similarity to an interaction indicated by the input data as weighted by the inverse of the time elapsed (in, e.g., seconds, hours, or days) since the last interaction. The interaction determination component 296 may adjust the score based on positive or negative feedback from the user. The interaction determination component 296 may normalize the score to a fixed range, such as 0.0-1.0 or 0-5.

FIG. 4E illustrates a set of exemplary indications of a handover from a first, general-purpose speech-processing configuration to a second, automobile-specific speech-processing configuration when a system receives audio data that includes a wakeword corresponding to the first system and a command corresponding to the second system (e.g., "Alexa, roll down my window."). Illustrated are five different interaction scores, in which a higher score indicates a greater interaction. For example, a score of 1 corresponds to the indication (represented in response data) "SmartCar can do that for you. I will hand you off shortly. Would you first like to hear additional SmartCar capabilities?"; a score of 2 correspond to the indication "SmartCar can do that for you. I am handing you off"; a score of 3 corresponds to the indication "SmartCar can do that for you"; a score of 4 corresponds to the indication "OK, here's SmartCar"; and a score of 5 corresponds to the indication "OK." In some embodiments, the indication is or includes a nonspeech audio indication of the second speech-processing configuration, such as a tone or beep. In other embodiments, the indication is text, video, or other data. The present disclosure is not, limited to any number of scores or types of indications.

Figure 5:
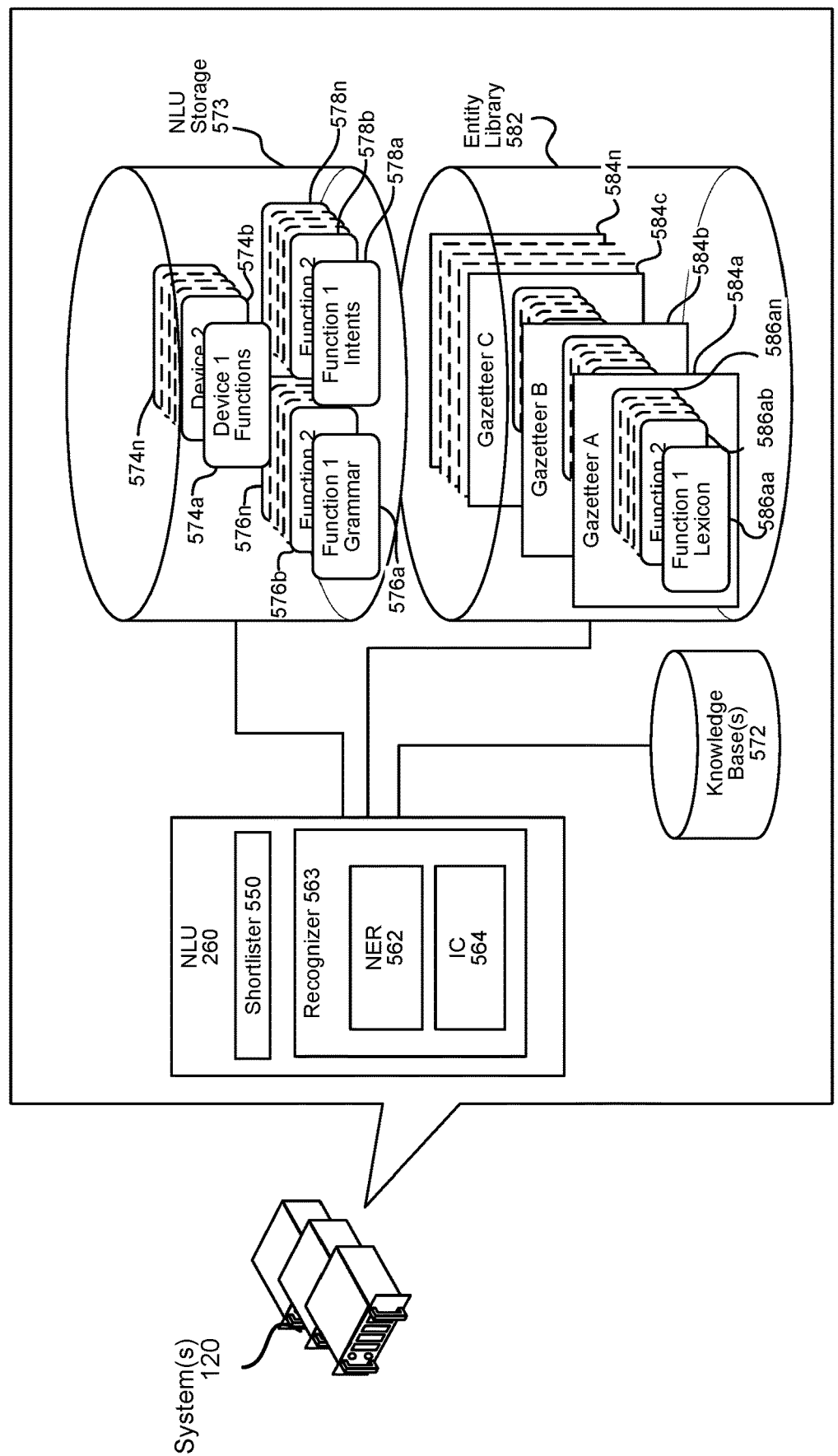
FIG. 5 is a conceptual diagram of natural language processing components according to embodiments of the present disclosure.

FIG. 5 illustrates how NLU processing may be performed on input text data. Generally, the NLU component 260 (such as the one(s) depicted in FIGS. 2A-2E attempts to make a semantic interpretation of text represented in text data. That is, the NLU component 260 determines the meaning behind the text represented in text data based on the individual words. The NLU component 260 interprets text to derive an intent or a desired action of the user as well as the pertinent pieces of information in the text that allow a device (e.g., local device 110, system 120, skill(s) 290, or skill system(s) 225) to complete that action.

The NLU component 260 may process text data including several hypotheses of a single utterance. For example, if the ASR component 250 outputs ASR results including an N-best list of hypotheses, the NLU component 260 may process the text data with respect to all (or a portion of) the textual interpretations represented therein.

The NLU component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 550. The shortlister component 550 selects applications that may execute with respect to text data 610 input to the NLU component (e.g., applications that may execute the command). The shortlister component 550 thus limits downstream, more resource intensive NLU processes to being performed with respect to applications that may execute the command.

Without a shortlister component 550, the NLU component 260 may process a given hypothesis with respect to every application of the system, either in parallel, in series, or using some combination thereof. By implementing a shortlister component 550, the NLU component 260 may process a given hypothesis with respect to only the applications that may execute the command. This reduces total compute power and latency attributed to NLU processing.

The NLU component 260 may include one or more recognizers 563a-n. Each recognizer 563 may be associated with a different "function" or "content source" (e.g., a different skill 290 or skill). The NLU component 260 may determine a function potentially associated with the command represented in text data input thereto in order to determine the proper recognizer 563 to process the hypothesis. The NLU component 260 may determine a command represented in text data is potentially associated with more than one function. Multiple recognizers 563 may be functionally linked (e.g., a telephony/communications recognizer and a calendaring recognizer may utilize data from the same contact list).

If the shortlister component 550 determines text corresponding to a hypothesis is potentially associated with multiple skills 290, the recognizers 563 associated with the skills 290 (e.g., the recognizers 563 associated with the applications in the subset selected by the shortlister 550) may process the text. The selected recognizers 563 may process the text in parallel, in series, partially in parallel, etc. For example, if text corresponding to a hypothesis potentially implicates both a communications application and a music application, a recognizer associated with the communications application may process the text in parallel, or partially in parallel, with a recognizer associated with the music application processing the text. The output generated by each recognizer 563 may be scored, with the overall highest scored output from all recognizers 563 ordinarily being selected to be the correct result.

If the NLU component 260 determines a command represented in text data is potentially associated with multiple functions, the recognizers 563 associated with the functions may each process the text data in parallel. For example, if a command potentially implicates both a communications function and a music function, a recognizer associated with the communications function may process the text data in parallel, or substantially in parallel, with a recognizer associated with the music function processing the text data. The output generated by each recognizer may be scored to indicate the respective recognizers confidence in its processing of the text data.

The NLU component 260 may communicate with various storages to determine the potential function(s) associated with a command represented in text data. The NLU component 260 may communicate with an NLU storage 573, which includes databases of devices (574a-574n) identifying functions associated with specific devices. For example, the local device 110 may be associated with functions for music, calendaring, contact lists, device-specific communications, etc. In addition, the NLU component 260 may communicate with an entity library 582, which includes database entries about specific services on a specific device, either indexed by device ID, user ID, or group user ID, or some other indicator.

Each recognizer 563 may include a named entity recognition (NER) component 562. The NER component 562 attempts to identify grammars and lexical information that may be used to construe meaning with respect to a command represented in text data input therein. The NER component 562 identifies portions of text represented in text data input into the NLU component 260 that correspond to a named entity that may be recognizable by the system. The NER component 562 (or other component of the NLU component 260) may also determine whether a word refers to an entity that is not explicitly mentioned in the utterance text, for example words such as "him," "her," or "it."

Each recognizer 563, and more specifically each NER component 562, may be associated with a particular grammar model 576, a particular set of intents/actions 578, and a particular personalized lexicon 586. Each gazetteer 584 may include function-indexed lexical information associated with a particular user and/or device. For example, gazetteer A (584a) includes function-indexed lexical information 586aa to 586an. A user's music function lexical information might include album titles, artist names, and song names, for example, whereas a user's contact-list lexical information might include the names of contacts. Since every user's music collection and contact list is presumably different, this personalized information improves entity resolution.

An NER component 562 may apply grammar models 576 and/or lexical information 586 associated with the function (associated with the recognizer 563 implementing the NER component 562) to determine a mention one or more entities in text data input thereto. In this manner, the NER component 562 may identify "slots" (i.e., particular words in text data) that may be needed for later command processing. The NER component 562 may also label each slot with a type of varying levels of specificity (e.g., noun, place, city, artist name, song name, etc.).

Each grammar model 576 may include the names of entities (i.e., nouns) commonly found in text about the particular function to which the grammar model 576 relates, whereas the lexical information 586 is personalized to the user(s) and/or the local device 110 from which the input audio data 211 or input text data originated. For example, a grammar model 576 associated with a shopping function may include a database of words commonly used when people discuss shopping.

A process called named entity resolution may link a portion of text to an entity known to the system. To perform this named entity resolution, the NLU component 260 may use gazetteer information (584a-584n) stored in an entity library storage 582. The gazetteer information 584 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 563 may also include an intent classification (IC) component 564. The IC component 564 parses text data to determine an intent(s) of the function associated with the recognizer 563 that potentially corresponds to the text data. An intent corresponds to an action to be performed that is responsive to the command represented by the text data. The IC component 564 may communicate with a database 578 of words linked to intents. For example, a music intent database may link words and phrases such as "quiet," "volume off," and "mute" to a "mute" intent. The IC component 564 identifies potential intents by comparing words in the text data to the words and phrases in an intents database 578 associated with the function that is associated with the recognizer 563 implementing the IC component 564.

The intents identifiable by a specific IC component 564 may be linked to function-specific (i.e., the function associated with the recognizer 563 implementing the IC component 564) grammar model 576 with "slots" to be filled. Each slot of a grammar model 576 may correspond to a portion of the text data that the system believes corresponds to an entity. For example, a grammar model 576 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified object and any object modifier (e.g., a prepositional phrase), such as {Artist Name}, {Album Name}, {Song name}, etc. The NER component 562 may then search corresponding fields in a lexicon 586 associated with the function associated with the recognizer 563 implementing the NER component 562 and may match words and phrases in the text data the NER component 562 previously tagged as a grammatical object or object modifier with those identified in the lexicon 586.

The NER component 562 may perform semantic tagging, which is the labeling of a word or combination of words according to their type/semantic meaning. The NER component 562 may parse text data using heuristic grammar rules, or a model may be constructed using techniques such as hidden Markov models, maximum entropy models, log linear models, conditional random fields (CRF), and the like. For example, an NER component 562 implemented by a music function recognizer 563 may parse and tag text corresponding to "play mother's little helper by the rolling stones" as {Verb}: "Play," {Object}: "mother's little helper," {Object Preposition}: "by," and {Object Modifier}: "the rolling stones." The NER component 562 may identify "Play" as a verb based on a word database associated with the music function, which an IC component 564 (which may also implemented by the music function recognizer 563) may determine that the word corresponds to a <PlayMusic> intent. At this stage, no determination may have been made as to the meaning of "mother's little helper" and "the rolling stones," but based on grammar rules and models, the NER component 562 may have determined that the text of these phrases relates to the grammatical object (i.e., entity) of the text data.

The frameworks linked to the intent may then be used to determine what database fields may be searched to determine the meaning of these phrases, such as searching a user's gazetteer 584 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 584 does not resolve a slot/field using gazetteer information, the NER component 562 may search, in the knowledge base 572, the database of generic words associated with the function. For example, if the text data includes text corresponding to "play songs by the rolling stones," after failing to determine an album name or song name called "songs" by "the rolling stones," the NER component 562 may search the function's vocabulary for the word "songs." In the some embodiments, generic words may be checked before the gazetteer information, or both may be tried, potentially producing two different results.

The NLU component 260 may tag text to attribute meaning to the text. For example, the NLU component 260 may tag "play mother's little helper by the rolling stones" as {intent}: <PlayMusic>, {artist name}: rolling stones, {media type}: SONG, and {song title}: mother's little helper. In another example, the NLU component 260 may tag "play songs by the rolling stones" as {intent}: <PlayMusic>, {artist name}: rolling stones, and {media type}: SONG.

The shortlister component 550 may receive text data 610 output from the ASR component 250 (as illustrated in FIG. 6). The ASR component 250 may embed the text data 610 into a form processable by a trained model(s) using sentence-embedding techniques. Sentence embedding may include, in the text data 610, text in a structure that enables the trained models of the shortlister component 550 to operate on the text. For example, an embedding of the text data 610 may be a vector representation of the text data.

The shortlister component 550 may make binary determinations (e.g., yes or no determinations) regarding which skill(s) 290 relate to the text data 610. The shortlister component 550 may make such determinations using the one or more trained models described herein above. If the shortlister component 550 implements a single trained model for each skill 290, the shortlister component 550 may simply run the models that are associated with enabled applications as indicated in a profile associated with the local device 110 and/or user that originated the command.

The shortlister component 550 may generate N-best list data representing applications that may execute with respect to the command represented in the text data 610. The size of the N-best list represented in the N-best list data is configurable. In an example, the N-best list data may indicate every application of the system as well as contain an indication, for each application, regarding whether the application is likely capable to execute the command represented in the text data 610. In another example, instead of indicating every application of the system, the N-best list data may only indicate all of the applications that are likely to be able to execute the command represented in the text data 610. In yet another example, the shortlister component 550 may implement thresholding such that the N-best list data may indicate no more than a maximum number of applications that may execute the command represented in the text data 610. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 610 by the shortlister component 550 relative to such applications).

The NLU component 260 may compile data, output by each of the recognizers 563 that processed the text data input to the NLU component 260, into a single N-best list, and may send N-best list data 640 (representing the N-best list) to a pruning component 650 (as illustrated in FIG. 6). Each entry in the N-best list data 640 may correspond to tagged text output by a different recognizer 563. Each entry in the N-best list data 640 may be associated with a respective score indicating the tagged text corresponds to the function associated with the recognizer 563 from which the tagged text was output. For example, the N-best list data 640 may be represented as:

[0.95] Intent: <PlayMusic> Source: Alexa, SmartCar
[0.70] Intent: <RollWindow> Source: SmartCar
[0.01] Intent: <Navigate> Source: Alexa, SmartCar
[0.01] Intent: <PlayVideo> Source: Alexa The pruning component 650 creates a new, shorter N-best list (i.e., represented in N-best list data 660 discussed below) based on the N-best list data 640. The pruning component 650 may sort the tagged text represented in the N-best list data 640 according to their respective scores.

The pruning component 650 may perform score thresholding with respect to the N-best list data 640. For example, the pruning component 650 may select entries represented in the N-best list data 640 associated with a score satisfying (e.g., meeting and/or exceeding) a score threshold. The pruning component 650 may also or alternatively perform number of entry thresholding. For example, the pruning component 650 may select the top scoring entry(ies) associated with each different category of function (e.g., music, shopping, communications, etc.) represented in the N-best list data 640, with the new N-best list data 660 including a total number of entries meeting or falling below a threshold number of entries. The purpose of the pruning component 650 is to create a new list of top scoring entries so that downstream, more resource intensive processes may only operate on the tagged text entries that most likely correspond to the command input to the system.

The NLU component 260 may also include a light slot filler component 652. The light slot filler component 652 can take text from slots represented in the tagged text entry or entries output by the pruning component 650 and alter it to make the text more easily processed by downstream components. The light slot filler component 652 may perform low latency operations that do not involve heavy operations such as reference to a knowledge base. The purpose of the light slot filler component 652 is to replace words with other words or values that may be more easily understood by downstream components. For example, if a tagged text entry includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the N-best list data 660.

The NLU component 260 sends the N-best list data 660 to an entity resolution component 670. The entity resolution component 670 can apply rules or other instructions to standardize labels or tokens from previous stages into an intent/slot representation. The precise transformation may depend on the function (e.g., for a travel function, the entity resolution component 670 may transform a text mention of "Boston airport" to the standard BOS three-letter code referring to the airport). The entity resolution component 670 can refer to an authority source (e.g., a knowledge base) that is used to specifically identify the precise entity referred to in each slot of each tagged text entry represented in the N-best list data 660. Specific intent/slot combinations may also be tied to a particular source, which may then be used to resolve the text. In the example "play songs by the stones," the entity resolution component 670 may reference a personal music catalog, Amazon Music account, user profile (described herein), or the like. The entity resolution component 670 may output data including an altered N-best list that is based on the N-best list represented in the N-best list data 660, but also includes more detailed information (e.g., entity IDs) about the specific entities mentioned in the slots and/or more detailed slot data that can eventually be used by a function. The NLU component 260 may include multiple entity resolution components 670 and each entity resolution component 670 may be specific to one or more functions.

The entity resolution component 670 may not be successful in resolving every entity and filling every slot represented in the N-best list data 660. This may result in the entity resolution component 670 outputting incomplete results. The NLU component 260 may include a final ranker component 690, which may consider such errors when determining how to rank the tagged text entries for potential execution. For example, if a book function recognizer 563 outputs a tagged text entry including a <ReadBook> intent flag, but the entity resolution component 670 cannot find a book with a title matching the text of the item, the final ranker component 690 may re-score that particular tagged text entry to be given a lower score. The final ranker component 690 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 690 may apply re-scoring, biasing, or other techniques to obtain the most preferred tagged and resolved text entry. To do so, the final ranker component 690 may consider not only the data output by the entity resolution component 670, but may also consider other data 691. The other data 691 may include a variety of information. For example, the other data 691 may include function rating or popularity data. For example, if one function has a particularly high rating, the final ranker component 690 may increase the score of a tagged text entry or entries associated with or otherwise invoking that particular function. The other data 691 may also include information about functions that have been specifically enabled by the user. For example, the final ranker component 690 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of local device 110, user ID, context, and other information may also be considered. For example, the final ranker component 690 may consider when any particular functions are currently active (e.g., music being played, a game being played, etc.). Following final ranking, the NLU component 260 may output NLU output data 685 to the orchestrator component 240. The NLU output data 685 may include various entries, with each entry representing an NLU processing confidence score, an intent, slot data, and a potential skill or skill that may operating with respect to the respective entry's data.

Following preliminary ranking, the NLU component 260 may output NLU results data 685. The NLU component 260 may send the NLU results data 685 to the orchestrator component 240. The NLU results data 685 may include first NLU results data 685*a* including tagged text associated with a first skill, second NLU results data 685*b* including tagged text associated with a second skill, etc. The NLU results data 685 may include tagged text data corresponding to the top scoring tagged text entries as determined by the preliminary ranker component 690.

The data 685 output from the NLU component 260 may include an N-best list of NLU results, where each item in the N-best list may correspond to a particular recognizer 563 and corresponding skill 290. Thus, for example, first NLU results of the N-best list may be associated with a first skill 290*a*, second NLU results of the N-best list may be associated with a second skill 290*b*, third NLU results of the N-best list may be associated with a third skill 290*c*, etc. Moreover, the first NLU results may correspond to text tagged to attribute meaning that enables the first skill 290*a* to execute with respect to the first NLU results, the second NLU results may correspond to text tagged to attribute meaning that enables the second skill 290*b* to execute with respect to the second NLU results, the third NLU results may correspond to text tagged to attribute meaning that enables the third skill 290*c* to execute with respect to the third NLU results, etc. The data 685 may also include scores corresponding to each item in the N-best list. Alternatively, the NLU result data 685 output to a particular skill 290 may include NER and IC data output by the particular skill's recognizer 563 while the NLU result data 685 output to the orchestrator component 240 may include only a portion of the NLU result data 685, for example the scores corresponding to certain skills.

The system may be configured with thousands, tens of thousands, etc. skills 290. The orchestrator component 240 enables the system to better determine the best skill 290 to execute the command input to the system. For example, first NLU results may correspond or substantially correspond to second NLU results, even though the first NLU results are operated on by a first skill 290*a* and the second NLU results are operated on by a second skill 290*b*. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The orchestrator component 240 may solicit the first skill 290*a* and the second skill 290*b* to provide potential result data based on the first NLU results and the second NLU results, respectively. For example, the orchestrator component 240 may send the first NLU results to the first skill 290*a* along with a request for the first skill 290*a* to at least partially execute a command with respect to the first NLU results. The orchestrator component 240 may also send the second NLU results to the second skill 290*b* along with a request for the second skill 290*b* to at least partially execute a command with respect to the first NLU results. The orchestrator component 240 receives, from the first skill 290*a*, first result data generated from the first skill's execution with respect to the first NLU results. The orchestrator component 240 also receives, from the second skill 290*b*, second results data generated from the second skill's execution with respect to the second NLU results.

The result data 685 may include various components. For example, the result data 685 may include content (e.g., audio data, text data, and/or video data) to be output to a user. The result data 685 may also include a unique identifier (ID) used by the remote system 120 and/or the skill server(s) 225 to locate the data to be output to a user. The result data 685 may also include an instruction. For example, if the command corresponds to "turn on the light," the result data 685 may include an instruction causing the system to turn on a light associated with a profile of the local device 110 and/or user.

The orchestrator component 240 may, prior to sending the NLU results data 685 to the orchestrator component 240, associate intents in the NLU results data 685 with skills 290. For example, if the NLU results data 685 includes a <PlayMusic> intent, the orchestrator component 240 may associate the NLU results data 685 with one or more skills 290 that can execute the <PlayMusic> intent. Thus, the orchestrator component 240 may send the NLU results data 685 paired with skills 290 to the orchestrator component 240. In response to input text data corresponding to "what should I do for dinner today," the orchestrator component 240 may generates pairs of skills 290 with associated intents corresponding to:

Skill 1/<Roll Down Window>
Skill 2/<Start Navigation>
Skill 3/<Play Music>

A system that does not use the orchestrator component 240 as described above may instead select the highest scored preliminary ranked NLU results data 685 associated with a single skill. The system may send the NLU results data 685 to the skill 290 along with a request for output data. In some situations, the skill 290 may not be able to provide the system with output data. This results in the system indicating to the user that the command could not be processed even though another skill associated with lower ranked NLU results data 685 could have provided output data responsive to the command.

Components of a system that may be used to perform unit selection, parametric TTS processing, and/or model-based audio synthesis are shown in FIG. 7A. As shown in FIG. 7A, the TTS component/processor 780 may include a TTS front end 716, a speech synthesis engine 718, TTS unit storage 772, TTS parametric storage 780, and a TTS back end 734. The TTS unit storage 772 may include, among other things, voice inventories 778*a*-288*n* that may include pre-recorded audio segments (called units) to be used by the unit selection engine 730 when performing unit selection synthesis as described below. The TTS parametric storage 780 may include, among other things, parametric settings 768*a*-268*n* that may be used by the parametric synthesis engine 732 when performing parametric synthesis as described below. A particular set of parametric settings 768 may correspond to a particular voice profile (e.g., whispered speech, excited speech, etc.).

In various embodiments of the present disclosure, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present disclosure is not, however, limited to any particular type of TTS front end 716. The speech model 722 may be used to synthesize speech without requiring the TTS unit storage 772 or the TTS parametric storage 780, as described in greater detail below.

The TTS front end 716 transforms input text data 710 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 780, within the memory and/or storage of the server 120, device 110, or within an external device.

Text data 710 input into the TTS component 780 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 780 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 780 to craft a natural-sounding audio waveform output. The language dictionary may also include letter-to-sound rules and other tools that may be used to pronounce previously unidentified words or letter combinations that may be encountered by the TTS component 780. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 780. Such acoustic features may include syllable-level features, word-level features, emotion, speaker, accent, language, pitch, energy, duration, and the like. Application of acoustic features may be based on prosodic models available to the TTS component 780. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778a-n). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data X790 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 780 may be configured to perform TTS processing in multiple languages. For each language, the TTS component 780 may include specially configured data, instructions and/or components to synthesize speech in the desired language(s). To improve performance, the TTS component 780 may revise/update the contents of the TTS storage 780 based on feedback of the results of TTS processing, thus enabling the TTS component 780 to improve speech recognition.

The TTS storage component 780 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-278n, where each unit database is configured with a different "voice" to match desired speech qualities. Such voice inventories may also be linked to user accounts. The voice selected by the TTS component 780 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 780 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the MINI and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 722 to ultimately create the output audio data 790.

When performing unit selection, after a unit is selected by the unit selection engine 730, the audio data corresponding to the unit may be passed to the synthesis component 720. The synthesis component 720 may then process the audio data of the unit to create modified audio data where the modified audio data reflects a desired audio quality. The synthesis component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 780. For each unit that corresponds to the selected portion, the synthesis component 720 may process the audio data for that unit to create a modified unit audio data. The modified unit audio data may then be concatenated to form the output audio data X790. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 780. In that case, other output data 785 may be output along with the output audio data X790 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data X790 may include other output data 785 that may include a prosody tag or other indicator that instructs the device 110 to slow down the playback of the output audio data X790, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

Figure 7B:
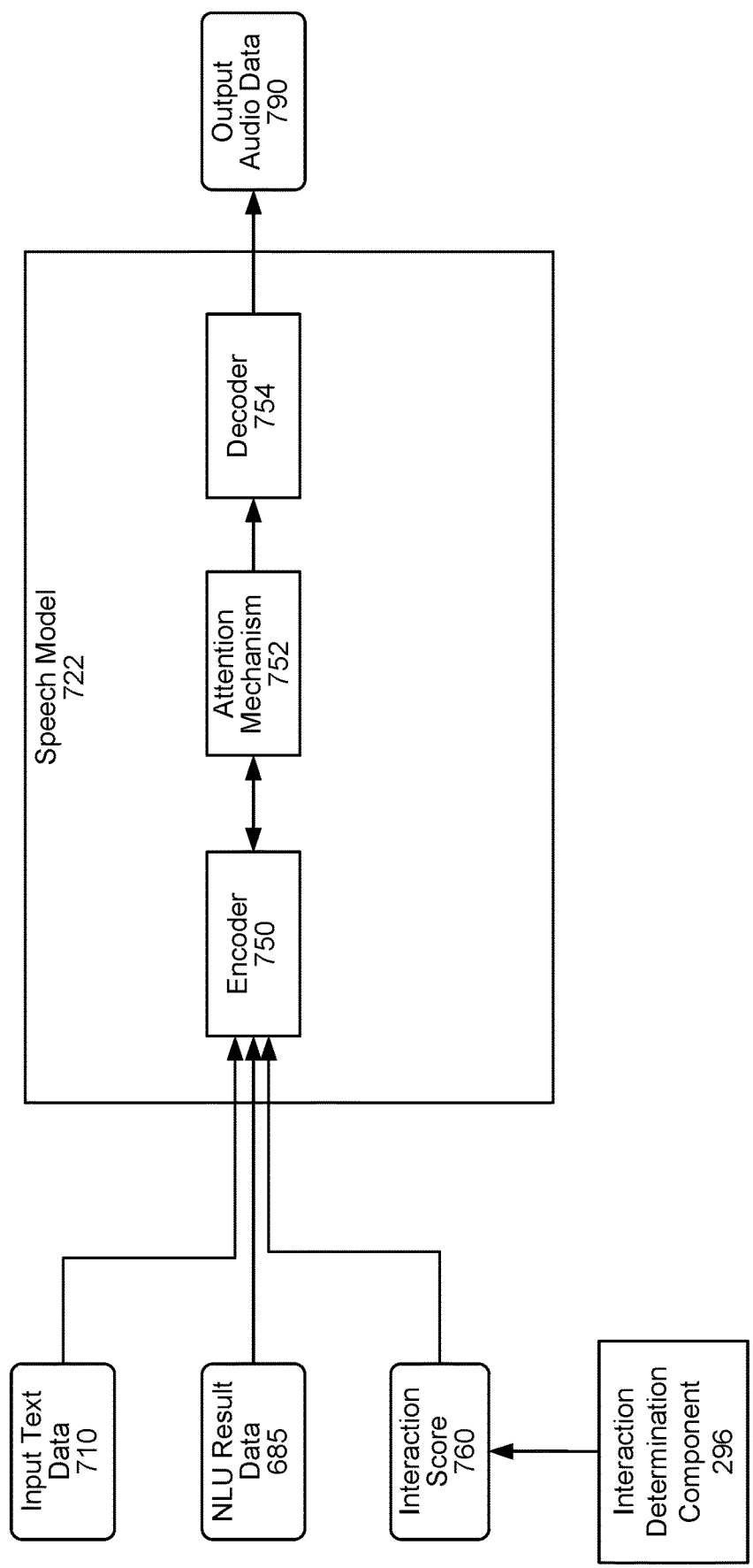
FIG. 7B is a conceptual diagram of a speech model according to embodiments of the present disclosure.

FIG. 7B illustrates an embodiment of the speech model 722. The speech model may include an encoder 750, attention mechanism 752, and a decoder 754. This arrangement of components may be referred to as a sequence-to-sequence model. The encoder 750 and/or decoder 754 may be neural networks having one or more layers. These layers may consist of one or more nodes; each node may receive input data or the output of a node from a previous layer and process that data in accordance with one or more model weights. For example, a node may multiply a value of an input with a model weight to produce an output. The neural networks may be deep neural networks (DNNs), convolutional neural networks (CNNs), and/or recurrent neural networks (RNNs). The neural networks may be trained using training data, such as recordings of utterances and corresponding text.

As descried herein, the interaction determination component 296 determines an interaction score 760. The encoder 750 may receive this interaction score 760, as well as input text data 710 corresponding to input data from the device 110 and/or the NLU result data 685. The encoder 750 may encode this information into a context vector, which is input to the decoder 754. Optionally, an attention mechanism 752 may receive this context vector as well as outputs of other nodes of the encoder 750 and weight (e.g., "attend") different outputs of the encoder 750 differently. The decoder 754 may then generate output audio data 790 (which may include the response data) using the context vector and/or output of the attention mechanism 752.

Figure 8:
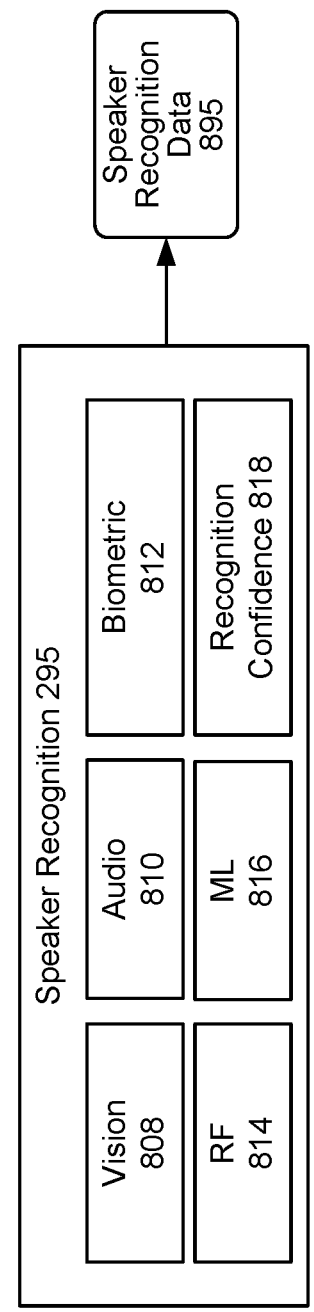
FIG. 8 is a conceptual diagram of a user recognition according to embodiments of the present disclosure.

As illustrated in FIG. 8, the user-recognition component 295 may include one or more subcomponents including a vision component 808, an audio component 810, a biometric component 812, a radio-frequency (RF) component 814, a machine-learning (ML) component 816, and a recognition confidence component 818. In some instances, the user-recognition component 295 may monitor data and determinations from one or more subcomponents to determine an identity of one or more users associated with data input to the system. The user-recognition component 295 may output user-recognition data 895, which may include a user identifier associated with a user the system believes is originating data input to the system. The user-recognition data 895 may be used to inform processes performed by the orchestrator 240 (or a subcomponent thereof) as described below.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user-recognition component 295 may utilize determinations from additional components to determine an identity of a user. The vision component 808 can be used in conjunction with other components to determine an identity of a user. For example, the user-recognition component 295 may use data from the vision component 808 with data from the audio component 810 to identify what user's face appears to be speaking at the same time audio is captured by the local device 110 for purposes of identifying a user who spoke an input to the local device 110.

The local device 110 may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user.

The RF component 814 may use RF localization to track devices that a user may carry or wear. For example, a user may be associated with a device. The device may emit RF signals (e.g., Wi-Fi, Bluetooth®, etc.). The local device 110 may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, the local device 110 may include some RF or other detection processing capabilities so that a user who speaks an input may scan, tap, or otherwise acknowledge his/her personal device to the local device 110. In this manner, the user may "register" with the local device 110 for purposes of the local device 110 determining who spoke a particular input. Such a registration may occur prior to, during, or after speaking of an input.

The ML component 816 may track the behavior of various users as a factor in determining a confidence level of the identity of the user. For example, a user may adhere to a regular schedule such that the user is at a first location during the day (e.g., at work or at school). In this example, the ML component 816 factors in past behavior and/or trends into determining the identity of the user that provided input to the local device 110. Thus, the ML component 816 may use historical data and/or usage patterns over time to increase or decrease a confidence level of an identity of a user.

In some instances, the recognition confidence component 818 receives determinations from the various components 808, 810, 812, 814, and 816, and may determine a final confidence level associated with the identity of a user. The confidence level or other score data may be included in the user-recognition data 895.

The audio component 810 may receive data from one or more sensors capable of providing an audio signal (e.g., one or more microphones) to facilitate recognizing a user. The audio component 810 may perform audio recognition on an audio signal to determine an identity of the user and associated user identifier. In some instances, the audio component 810 may perform voice recognition to determine an identity of a user.

The audio component 810 may also perform user identification based on audio received by the local device 110. The audio component 810 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 810 may perform user recognition by comparing audio characteristics representing the audio to stored audio characteristics of users.

Figure 9:
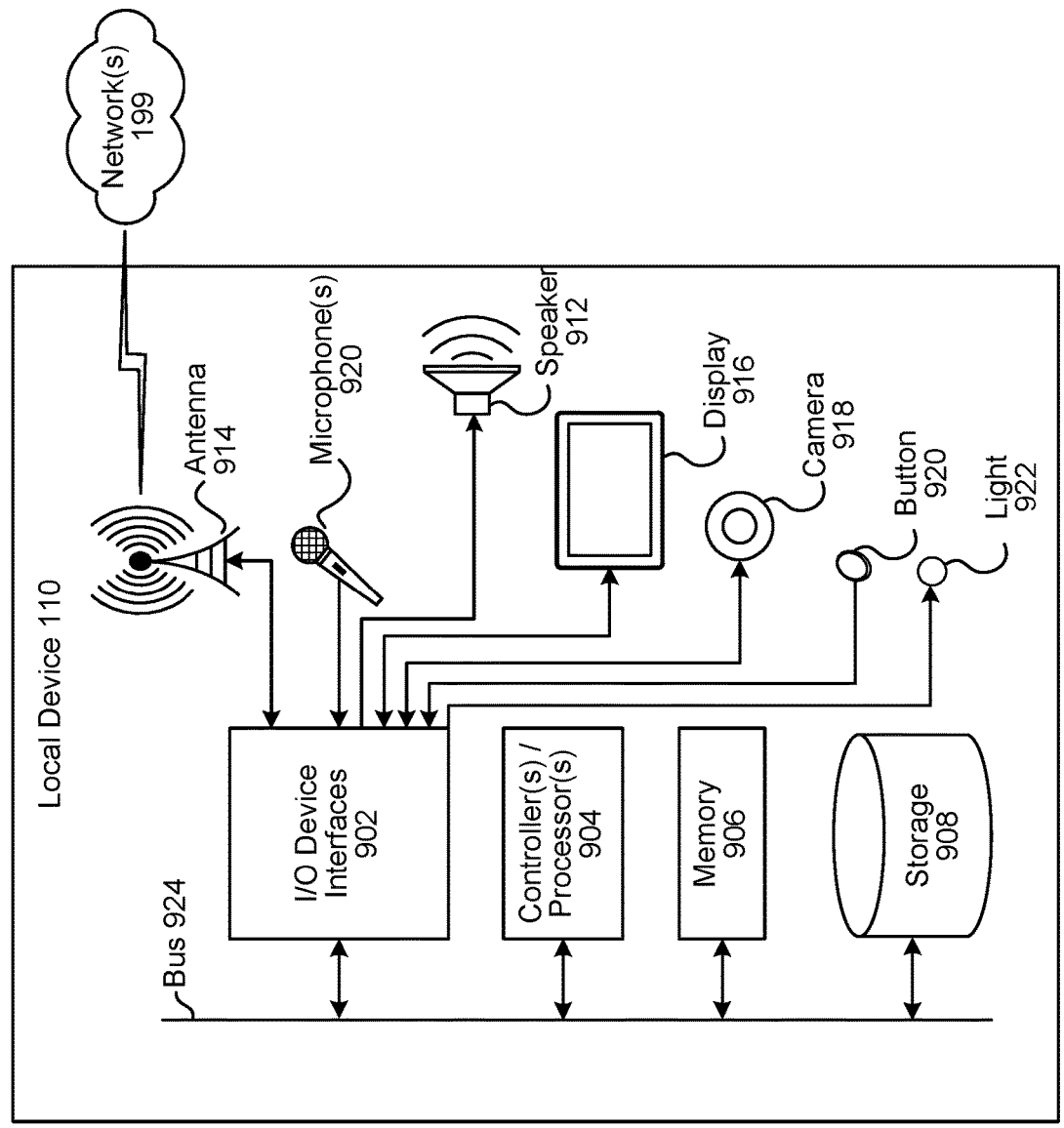
FIG. 9 is a block diagram conceptually illustrating example components of a device according to embodiments of the present disclosure.
Figure 10:
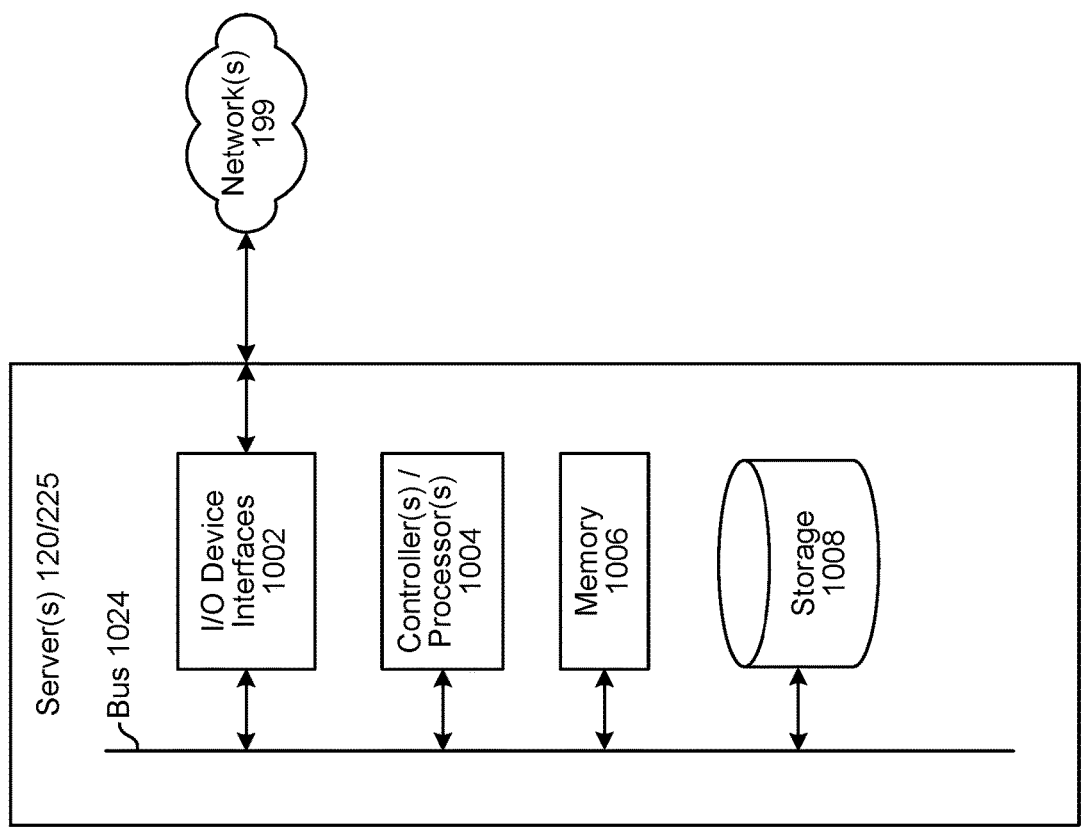
FIG. 10 is a block diagram conceptually illustrating example components of a server according to embodiments of the present disclosure.

FIG. 9 is a block diagram conceptually illustrating a local device 110 that may be used with the system. FIG. 10 is a block diagram conceptually illustrating example components of a remote device, such as the system(s) 120, which may assist with ASR processing, NLU processing, etc., and the skill system(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill system(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the local device 110 may include input/output device interfaces 902 that connect to a variety of components such as an audio output component such as a speaker 912, a wired headset or a wireless headset (not illustrated), or other component capable of outputting audio. The local device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The local device 110 may additionally include a display 916 for displaying content. The local device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor (s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the local device 110, the system(s) 120, and the skill system(s) 225, as described herein, are illustrative, and may be located as a stand-alone device or may be included, in whole or in part, as a component of a larger device or system.

Figure 11:
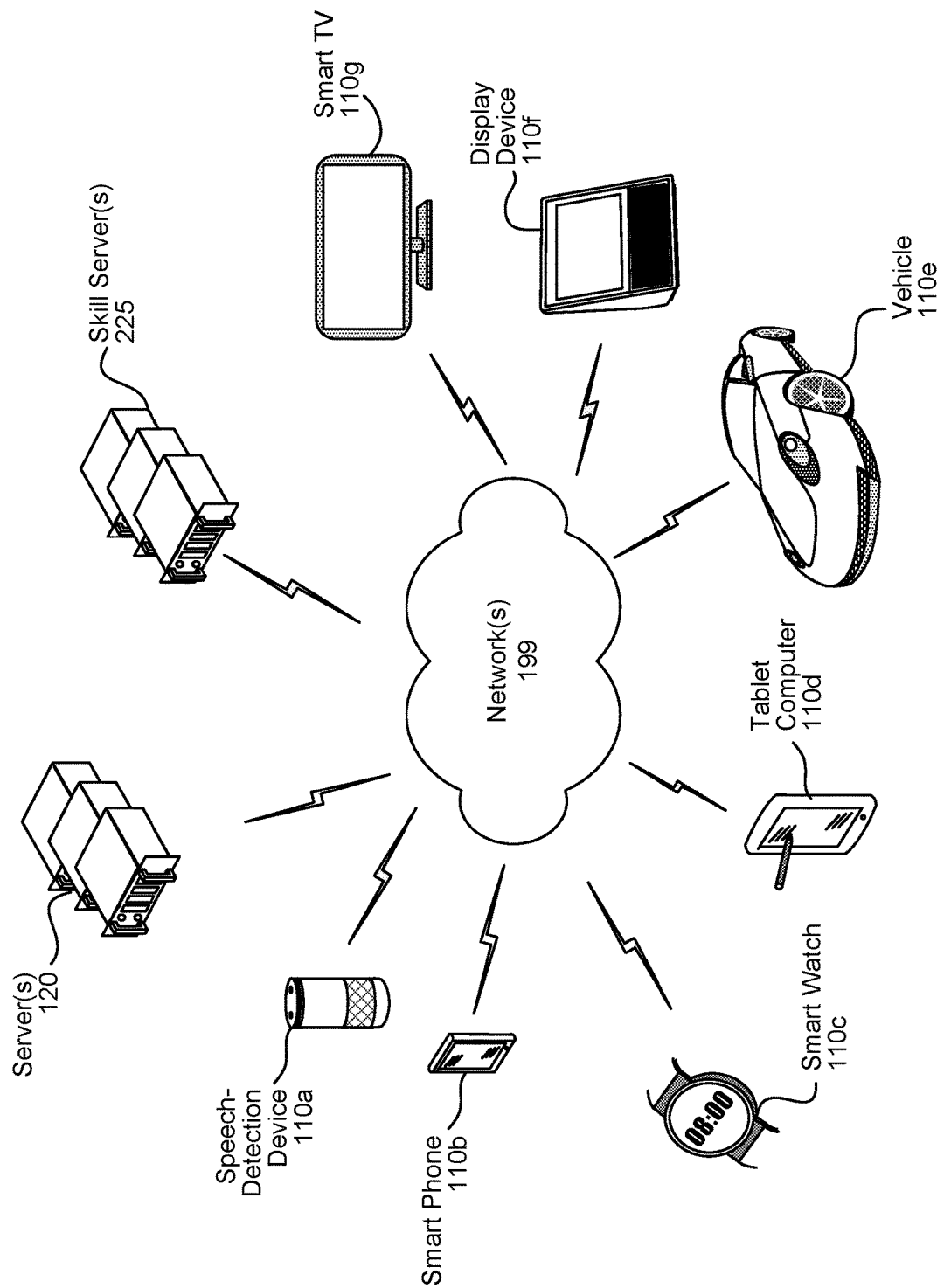
FIG. 11 illustrates an example of a computer network for use with the system according to embodiments of the present disclosure.

As illustrated in FIG. 11, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a vehicle 110e, a display vehicle 110f, and/or a smart television 110g may be connected to the network(s) 199 through a wireless service provider, over a Wi-Fi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc., of one or more servers 120.

The concepts disclosed herein may be applied within a number of different devices and computer systems, including, for example, general-purpose computing systems and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method for processing data representing a spoken command, the method comprising:
   receiving, from a user device, first audio data representing an utterance;
   determining that the first audio data includes:
      a first representation of a wakeword corresponding to a first speech-processing configuration, and
      a second representation of a command corresponding to a second speech-processing configuration;
   determining that the utterance is associated with a user account;
   determining, using user account, an interaction score corresponds to a first receipt of the command;
   generating, using the first speech-processing configuration and the interaction score, first output audio data, the first output audio data including a representation of a name of the second speech-processing configuration and acknowledgement of the first receipt;
   sending the first output audio data to a user device;
   generating, using the second speech-processing configuration, second output audio data, the second output audio data including a representation of a response to the command; and
   sending the second output audio data to the user device.

2. The method of claim 1, further comprising:
   receiving, from the user device, second audio data representing a second utterance;
   determining that the second audio data includes a third representation of the wakeword and a fourth representation of the command;

determining that the user account indicates that the second audio data corresponds to a second receipt of the command from a first user;

determining that a difference between a first time of the first receipt and a second time of the second receipt is less than a threshold;

after determining that the difference is less than a threshold, generating third output audio data, the third output audio data including a representation of the name of the second speech-processing configuration; and sending the third output audio data to the user device.

3. The method of claim 2, further comprising:

receiving, from the user device, third audio data representing a third utterance by a first user;

determining that the third audio data includes a fifth representation of the wakeword and a sixth representation of the command;

determining that the user account indicates that the third audio data corresponds to a third receipt of the command from the first user;

determining that a second difference between a second time of the second receipt and a time of the third receipt is greater than a threshold;

after determining that the second difference is less than a threshold, generating fourth output audio data, the fourth output audio data including a representation of the name of the second speech-processing configuration and acknowledgement of the third receipt; and sending the fourth output audio data to the user device.

4. The method of claim 1, further comprising:

adding, to the user account, an indication of sending the first output audio data;

determining that the first audio data includes an indication of presence of first user associated with the user account and a second user;

determining a second user account associated with the second user; and adding, to the second user account, the indication of sending the first output audio data.

5. A computer-implemented method comprising:

receiving, from a user device, first audio data including a representation of a command;

receiving, from the user device, first data representing a wakeword detected by the user device;

determining that the wakeword is associated with a first speech-processing configuration;

determining that the command is associated with a second speech-processing configuration;

determining a user account associated with the first audio data;

determining, based at least in part on the user account, output data representing an historical interaction with the second speech-processing configuration;

determining, using the first speech-processing configuration and the output data, second output data indicating that the command is associated with the second speech-processing configuration; and determining, using the second speech-processing configuration, third output data corresponding to a response to the command.

6. The computer-implemented method of claim 5, wherein determining the output data further comprises:

determining that the user account includes a first indication of the command; or determining that the user account includes a second indication of the second speech-processing configuration.

7. The computer-implemented method of claim 5, wherein determining the output data further comprises:

determining a first time of receipt of the first audio data;

determining that the user account includes a second time of receipt of second audio data, the second audio data including a second representation of the command; and determining that a difference between the first time and the second time is less than a threshold.

8. The computer-implemented method of claim 5, further comprising:

sending, to the user device, the second output data;

causing a status indicator of the user device to change from a first state to a second state; and sending, to the user device, the third output data.

9. The computer-implemented method of claim 5, further comprising:

receiving, from the user device, second audio data;

determining that the second audio data includes a user preference corresponding to the second speech-processing configuration; and based on the user preference, determining second output data representing historical interaction with the second speech-processing configuration, the second output data different from the output data.

10. The computer-implemented method of claim 5, further comprising:

determining that the first audio data includes an indication of presence of a first user associated with the user account and a second user; and adding, to a second user account associated with the second user, an indication of sending the second output data.

11. The computer-implemented method of claim 5, wherein determining the output data further comprises:

determining an urgency of the command;

determining an emotional state of a user proximate the user device; or determining an age of the user.

12. The computer-implemented method of claim 5, wherein determining the output data further comprises:

determining that the user account indicates protecting data from the second speech-processing configuration;

sending, to the user device, third output data corresponding to a request to use the second speech-processing configuration; and receiving, from the user device, second audio data including a grant of permission to use the second speech-processing configuration.

13. A computing device comprising:

at least one processor; and at least one memory including instructions that, when executed by the at least one processor, cause the computing device to:

receive, from a user device, first audio data including a representation of a command;

receiving, from the user device, first data representing a wakeword detected by the user device;

determine that the wakeword is associated with a first speech-processing configuration;

determine that the command is associated with a second speech-processing configuration;

determine a user account associated with the first audio data;

determine, based at least in part on the user account, output data representing an historical interaction with the second speech-processing configuration;

determining, using the first speech-processing configuration and the output data, second output data indicating that the command is associated with the second speech-processing configuration; and determine, using the second speech-processing configuration, third output data corresponding to a response to the command.

14. The computing device of claim 13, wherein the at least one memory further includes instructions that, when executed by the at least one processor, further cause the computing device to:

determine that the user account includes a first indication of the command; or determine that the user account includes a second indication of the second speech-processing configuration.

15. The computing device of claim 13, wherein the at least one memory further includes instructions that, when executed by the at least one processor, further cause the computing device to:

determine a first time of receipt of the first audio data;

determine that the user account includes a second time of receipt of second audio data, the second audio data including a second representation of the command; and determine that a difference between the first time and the second time is less than a threshold.

16. The computing device of claim 13, wherein the at least one memory further includes instructions that, when executed by the at least one processor, further cause the computing device to:

send, to the user device, the second output data;

cause a status indicator of the user device to change from a first state to a second state; and send, to the user device, the third output data.

17. The computing device of claim 13, wherein the at least one memory further includes instructions that, when executed by the at least one processor, further cause the computing device to:

receive, from the user device, second audio data;

determine that the second audio data includes a user preference corresponding to the second speech-processing configuration; and based on the user preference, determine second output data representing historical interaction with the second speech-processing configuration, the second output data different from the output data.

18. The computing device of claim 13, wherein the at least one memory further includes instructions that, when executed by the at least one processor, further cause the computing device to:

determine that the first audio data includes an indication of presence a first user associated with the user account and a second user; and add, to a second user account associated with the second user, an indication of sending the second output data.

19. The computing device of claim 13, wherein the at least one memory further includes instructions that, when executed by the at least one processor, further cause the computing device to:

determine an urgency of the command;

determine an emotional state of a user proximate the user device; or determine an age of the user.

20. The computing device of claim 13, wherein the at least one memory further includes instructions that, when executed by the at least one processor, further cause the computing device to:

determine that the user account indicates protecting data from the second speech-processing configuration;

send, to the user device, third output data corresponding to a request to use the second speech-processing configuration; and receive, from the user device, second audio data including a grant of permission to use the second speech-processing configuration.

* * * * *